United States Patent
Yossifon et al.

(10) Patent No.: US 11,185,859 B2
(45) Date of Patent: Nov. 30, 2021

(54) SYSTEM AND METHOD FOR MEASURING FLOW

(71) Applicant: Technion Research & Development Foundation Limited, Haifa (IL)

(72) Inventors: Gilad Yossifon, Mazkeret Batia (IL); Matan Zehavi, Netanya (IL)

(73) Assignee: Technion Research & Development Foundation Limited, Haifa (IL)

( * ) Notice: Subject to any disclaimer, the term of this patent is extended or adjusted under 35 U.S.C. 154(b) by 406 days.

(21) Appl. No.: 15/739,848

(22) PCT Filed: Jun. 28, 2016

(86) PCT No.: PCT/IL2016/050687
§ 371 (c)(1),
(2) Date: Dec. 26, 2017

(87) PCT Pub. No.: WO2017/002109
PCT Pub. Date: Jan. 5, 2017

(65) Prior Publication Data
US 2018/0369811 A1    Dec. 27, 2018

(30) Foreign Application Priority Data

Jun. 28, 2015 (IL) .......................... 239691

(51) Int. Cl.
| | |
|---|---|
| *B01L 99/00* | (2010.01) |
| *B01L 3/00* | (2006.01) |
| *G01F 1/708* | (2006.01) |
| *G01F 1/704* | (2006.01) |
| *G01F 1/56* | (2006.01) |

(52) U.S. Cl.
CPC ..... *B01L 3/502715* (2013.01); *B01L 3/50273* (2013.01); *G01F 1/56* (2013.01); *G01F 1/708* (2013.01); *G01F 1/7046* (2013.01); *B01L 2200/027* (2013.01); *B01L 2300/0645* (2013.01); *B01L 2300/0663* (2013.01); *B01L 2300/0816* (2013.01)

(58) Field of Classification Search
None
See application file for complete search history.

(56) References Cited

U.S. PATENT DOCUMENTS

| | | |
|---|---|---|
| 6,221,226 B1 | 4/2001 | Kopf-Sill |
| 7,225,683 B2 | 6/2007 | Harnett et al. |
| (Continued) | | |

OTHER PUBLICATIONS

Supplementary European Search Report and the European Search Opinion dated Oct. 30, 2018 From the European Patent Office Re. Application No. 16817372.2. (13 Pages).
(Continued)

*Primary Examiner* — Paul S Hyun

(57) ABSTRACT

A sensor system comprises a permselective medium positionable to contact a fluid in a microchannel, an arrangement of electrodes arranged to generate an electric field across the permselective medium, an ion concentration sensing system having a sensing element configured to provide sensing signals indicative of a local ion concentration pattern, and a signal processor for analyzing a sensing signal received from the ion concentration sensing system to determine at least one flow parameter characterizing the flow.

18 Claims, 17 Drawing Sheets

(56) References Cited

U.S. PATENT DOCUMENTS

| | | |
|---|---|---|
| 8,834,696 B2 | 9/2014 | Kim et al. |
| 2002/0008032 A1 | 1/2002 | Hayenga |
| 2002/0129664 A1 | 9/2002 | Jorgenson et al. |
| 2009/0291341 A1* | 11/2009 | Miyata ............... H01M 16/006 |
| | | 429/513 |
| 2011/0198225 A1 | 8/2011 | Kim et al. |
| 2012/0322076 A1* | 12/2012 | Chang ................ C12Q 1/6816 |
| | | 435/6.12 |

OTHER PUBLICATIONS

Kim et al. "Amplified Electrokinetic Response by Concentration Polarization Near Nanofluidic Channel", Langmuir, XP055342336, 25(13): 7759-7765, Published on Web Apr. 9, 2009. Abstract, Part 'I. Introduction', Fig. 1.

Slouka et al. "Microfluidic Systems With Ion-Selective Membranes", Annual Review of Analytical Chemsitry, XP055238267, 7(1): 317-335, Published Online Apr. 14, 2014. Abstract, Part '4. Applications', Figs. 7a, 7b, 8a, 8b.

Office Action and Search Report dated Dec. 31, 2015 From the Israel Patent Office Re. Application No. 239691.

Kim et al. "Nanofluidic Concentration Devices for Biomolecules Utilizing Ion Concentration Polarization: Theory, Fabrication, and Applications", Chemical Society Reviews, 39(3): 912-922, Published Online Jan. 4, 2010.

Communication Pursuant to Article 94(3) EPC Dated Jul. 17, 2019 From the European Patent Office Re. Application No. 16817372.2. (7 Pages).

\* cited by examiner

SYSTEM AND METHOD FOR MEASURING FLOW

RELATED APPLICATIONS

This application is a National Phase of PCT Patent Application No. PCT/IL2016/050687 having International filing date of Jun. 28, 2016, which claims the benefit of priority of Israel Patent Application No. 239691 filed on Jun. 28, 2015. The contents of the above applications are all incorporated by reference as if fully set forth herein in their entirety.

FIELD AND BACKGROUND OF THE INVENTION

The present invention, in some embodiments thereof, relates to fluidic systems and, more particularly, but not exclusively, to a system and method for measuring flow.

Much industrial and academic effort is presently directed at the development of integrated micro devices or systems combining electrical, mechanical and/or optical/electrooptical components, commonly known as Micro Electro Mechanical Systems (MEMS). MEMS are fabricated using integrated circuit batch processing techniques and can range in size from micrometers to millimeters. These systems can sense, control and actuate on the micro scale, and function individually or in arrays to generate effects on the macro scale. MEMS include numerous applications, such as airbag accelerometers, ink-jet heads, radio frequency microswitches for wireless communications, micro-gyroscopes, digital micro-mirror displays, pico-satellites and the like.

Whenever mechanics can replace electronics, it provides superior functionality and is not subject to undesirable electronic noise. For example, the classical electronic components of fiber-optic networks are now being replaced with optical MEMS switches that enable the creation of arrays of miniature high capacity switches which can play a critical role in the development of large-scale optical switches in fiber-optic networks.

MEMS may consist of mechanical microstructures, microsensors, microactuators and electronics integrated in the same environment (e.g., on a silicon chip). The microfabrication technology enables fabrication of large arrays of devices, which individually perform simple tasks but in combination can accomplish complicated functions. For example, MEMS for guidance, navigation, motion control and high resolution flow visualization can provide experimental evidence about small-scale phenomena and thus verify fundamental principles in the microcosm.

One type of MEMS is a microfluidic device. Microfluidic devices include components such as channels, reservoirs, mixers, pumps, valves, chambers, cavities, reaction chambers, heaters, fluidic interconnects, diffusers, nozzles, and other microfluidic components. These microfluidic components typically have dimensions between a few micrometers and a few hundreds of micrometers. The small dimensions of the components minimize the physical size, the power consumption, the response time and the waste of the entire system. Such systems may provide wearable miniature devices located either outside or inside the human body.

Applications for microfluidic devices include genetic, chemical, biochemical, pharmaceutical, biomedical, chromatography, integrated circuit cooling, ink-jet printing, medical, radiological and environmental applications. The medical applications include diagnostic and patient management such as implanted drug dispensing systems. The environmental applications include detecting hazardous materials or conditions such as air or water pollutants, chemical agents, biological organisms or radiological conditions. The genetic and biochemical applications include testing and/or analysis of DNA, and other macro or smaller molecules, or reactions between such molecules in microfluidic devices, in an approach known as "lab-on-chip."

Microfluidic devices presently occupy an increasingly significant position in chemical and biochemical sensing, molecular separations, drug delivery and other forefront technologies. In a manner similar to that for microelectronics, microfluidic technologies enable the fabrication of highly integrated devices applicable to high throughput, low volume, automatable chemical and biochemical analyses and syntheses. Common fluids used in microfluidic devices include whole blood samples, bacterial cell suspensions, protein or antibody or nucleic acid solutions and various buffers.

Known in the art are thermal flow sensors that include a heating element immersed within fluidic channel. Upon application of forced fluid flow in the channel, temperature changes relative to the base state of the heating element are measured. The flow alters the temperature distribution through heat convection, and the measurement allows determining the flow rate in the channel.

U.S. Pat. No. 7,225,683 discloses a device for measuring the flow rate of a fluid in a flow channel. The device includes means for creating localized compositional variations in the fluid along the flow axis, means for subsequently detecting the compositional variation at a point downstream from its point of creation, and means for measuring flight time. The device is capable of measuring flow rates from less than about 1 nL/min to greater than about 10 µL/min at pressures as great as 2,000 psi.

SUMMARY OF THE INVENTION

According to an aspect of some embodiments of the present invention there is provided a sensor system for sensing flow of fluid in a microchannel. The system comprises: a permselective medium positionable to contact the fluid in the microchannel; an arrangement of electrodes arranged to generate an electric field across the permselective medium; an ion concentration sensing system having a sensing element configured to provide sensing signals indicative of a local ion concentration pattern; and a signal processor for analyzing a sensing signal received from a single sensing element of the ion concentration sensing system to determine at least one flow parameter characterizing the flow.

According to an aspect of some embodiments of the present invention there is provided a sensor system for sensing flow of fluid in a microchannel. The system comprises: a permselective medium positionable to contact the fluid in the microchannel; an arrangement of electrodes arranged to generate an electric field across the permselective medium; a power source for driving the arrangement of electrodes to generate the electric field; an ion concentration sensing system configured to provide sensing signals indicative of ion concentration patterns effected by the flow of fluid in the microchannel; a controller for controlling the power source to ensure that a duration of the generated electric field is longer than a time required for the sensing signals to exhibit saturation; and a signal processor for analyzing the sensing signals, during the saturation, to determine at least one flow parameter characterizing the flow.

According to some embodiments of the invention the ion concentration sensing system is arranged at to sense the patterns at one or two opposite sides of the permselective medium.

According to some embodiments of the invention the ion concentration sensing system is arranged at to sense the patterns at one or two opposite sides of the permselective medium and also downstream the flow.

According to some embodiments of the invention the ion concentration sensing system comprises at least one system selected from the group consisting of a spectroscopic system, an optical sensing system, an electric sensing system and a magnetic sensing system.

According to an aspect of some embodiments of the present invention there is provided a sensor system for sensing flow of fluid in a microchannel. The system comprises: a permselective medium positionable to contact the fluid in the microchannel; an arrangement of electrodes arranged to generate an electric field across the permselective medium, and to generate sensing signals indicative of ion concentration patterns effected by the flow of fluid in the microchannel; and a signal processor for analyzing the signals to determine at least one flow parameter characterizing the flow, wherein at least one pair of electrodes that generate the electric field also generate the sensing signals.

According to some embodiments of the invention the arrangement of electrodes comprises electrodes arranged to sense the patterns at one or two opposite sides of the permselective medium.

According to some embodiments of the invention the arrangement of electrodes comprises electrodes arranged at to sense the patterns also downstream the flow.

According to some embodiments of the invention the system comprises a power source for driving to the arrangement of electrodes to generate the electric field, and a controller for controlling the power source to ensure that a duration of the generated electric field is longer than a time required for the sensing signals to exhibit saturation.

According to some embodiments of the invention the permselective medium comprises at least one medium selected from the group consisting of: a nanostructure, a nanoporous membrane and an electrode.

According to some embodiments of the invention the permselective material comprises a cation exchange material.

According to some embodiments of the invention the cation exchange material is non-permeable to anions.

According to some embodiments of the invention the cation exchange material comprises at least one substance selected from the group consisting of a perfluorosulfonate cation exchange material, and amniotic membrane extract (AMX).

According to some embodiments of the invention the permselective material comprises an anion exchange material.

According to some embodiments of the invention the anion exchange material is non-permeable to cations.

According to some embodiments of the invention the permselective material is polymeric.

According to some embodiments of the invention the fluid comprises a solvent and dissolved species, and wherein the permselective medium comprises at least one electrode inducing variations in the ion concentration via electrolysis of at least one of the solvent and the dissolved species.

According to some embodiments of the invention the signal processor is configured for determining the at least one flow parameter by extracting from the sensing signals at least one electrical parameter, and correlating the at least one electrical parameter to the at least one flow parameter.

According to some embodiments of the invention the signal processor is configured for determining a time required for the sensing signals to exhibit saturation, and for correlating the time to the at least one flow parameter.

According to an aspect of some embodiments of the present invention there is provided a microfluidic system. The microfluidic system comprises: a microchannel; and the sensor system as delineated above and optionally as further detailed below.

According to some embodiments of the invention the at least one microchannel is a branched fluidic microchannel, and wherein the permselective medium connects between two branches of the branched microchannel.

According to some embodiments of the invention the sensor system comprises two secondary microchannels positioned generally parallel to the microchannel, such that the permselective medium connects each of the secondary microchannels with the microchannel, and wherein the electrodes are arranged to generate the electric field along the secondary microchannels.

According to some embodiments of the invention the microfluidic system comprises a pump for generating the flow, and a controller configured for controlling the pump responsively to the determined flow parameter.

According to an aspect of some embodiments of the present invention there is provided a microfluidic system. The microfluidic system comprises: branched fluidic microchannel; and a permselective medium connecting between two branches of the branched microchannel; an arrangement of electrodes arranged to generate an electric field across the permselective medium; an ion concentration sensing system configured to provide signals indicative of ion concentration patterns effected by the flow of fluid in the microchannel; and a signal processor for analyzing the signals to determine at least one flow parameter characterizing the flow.

According to an aspect of some embodiments of the present invention there is provided a microfluidic system. The microfluidic system comprises: a microchannel; and a sensor system, positioned to measure flow in the microchannel, the sensor system comprises: two secondary microchannels positioned generally parallel to the microchannel; a permselective medium connecting each of the secondary microchannels with the microchannel; an arrangement of electrodes arranged to generate an electric field along the secondary microchannels; an ion concentration sensing system configured to provide signals indicative of ion concentration patterns effected by the flow of fluid in the microchannel; and a signal processor for analyzing the signals to determine at least one flow parameter characterizing the flow.

According to an aspect of some embodiments of the present invention there is provided a method of sensing flow of fluid in a microchannel. The method comprises: generating electric field across a permselective medium being positioned in the microchannel, in contact with the fluid; sensing local ion concentration patterns effected by the flow of fluid in the fluidic microchannel, using an ion concentration sensing system having a sensing element; and analyzing a sensing signal received from a single sensing element of the ion concentration sensing system to determine at least one flow parameter characterizing the flow.

According to some embodiments of the invention the generating electric field is continued for duration longer than a time required for the sensing signal to exhibit saturation.

According to an aspect of some embodiments of the present invention there is provided a method of sensing flow of fluid in a microchannel. The method comprises: generating electric field across a permselective medium being positioned in the microchannel, in contact with the fluid; sensing signals indicative of ion concentration patterns effected by the flow of fluid in the microchannel, wherein the generating the electric field is continued for duration longer than a time required for the sensing signal to exhibit saturation; and analyzing the sensing signals, during the saturation, to determine at least one flow parameter characterizing the flow.

According to an aspect of some embodiments of the present invention there is provided a method of sensing flow of fluid in a microchannel. The method comprises: generating electric field across a permselective medium being positioned in the microchannel, in contact with the fluid; sensing signals indicative of ion concentration patterns effected by the flow of fluid in the microchannel, wherein the sensing is by a pair of electrode that is also used for the generation of the electric field; and analyzing the sensing signals to determine at least one flow parameter characterizing the flow.

According to some embodiments of the invention the flow is at a characteristic flow rate of less than 100 microliter per minute.

According to some embodiments of the invention the fluid is selected from the group consisting of water, a liquid drug, an electrolyte, a body fluid, a bacterial cell suspension, a protein solution, an antibody solution, a nucleic acid solution, insulin and ink.

According to some embodiments of the invention the fluidic microchannel is a fluidic microchannel of a pump, and the method comprises controlling the pump responsively to the determined flow parameter.

According to some embodiments of the invention method comprises extracting from the sensing signals at least one electrical parameter, and correlating the at least one electrical parameter to the at least one flow parameter.

According to some embodiments of the invention the at least one electrical parameter is selected from the group consisting of electrical current, electrical impedance, electrical resistance and electrical conductance.

According to some embodiments of the invention method comprises determining a time required for the sensing signals to exhibit saturation, and correlating the time to the at least one flow parameter.

According to some embodiments of the invention the at least one flow parameter comprises flow rate.

According to some embodiments of the invention the at least one flow parameter comprises flow direction.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
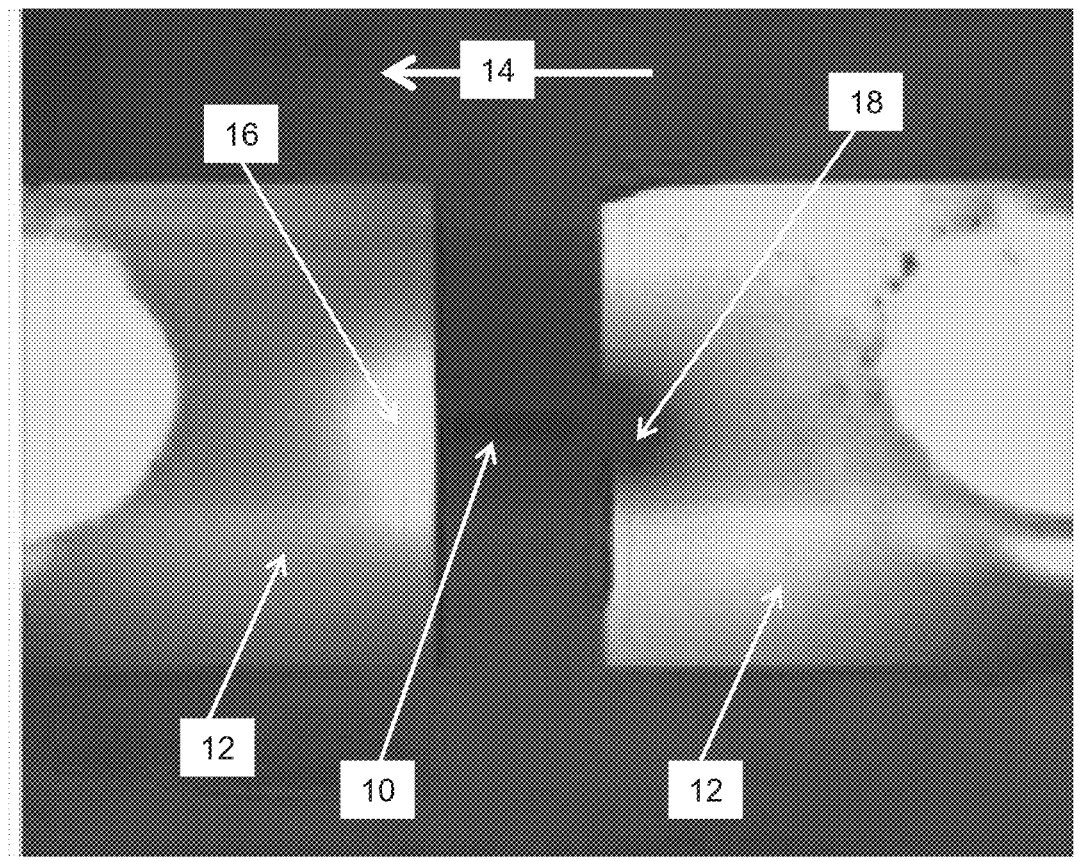
FIGS. 1A and 1B show representative example of a concentration polarization (CP) effect demonstrated according to some embodiments of the present invention.

The present invention, in some embodiments thereof, relates to fluidic systems and, more particularly, but not exclusively, to a system and method for measuring flow.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Some embodiments of the present invention induce a concentration polarization (CP) effect for measuring a flow parameter. In this effect local ionic concentration gradients are generated at an interface of fluid and an ion permselective medium upon application of voltage or current across the permselective medium. More specifically an enriched ionic concentration is formed at one side of the permselective medium and a depleted ionic concentration is formed at its opposite side, when both sides interface a fluid. When a pair of electrodes is in contact with the fluid (e.g., submerged) a change of the ion concentration can be electrochemically generated, for example, by a process of electrolysis of a solvent or species dissolved therein. Specifically, local composition variations can be formed by electrochemical oxidation or reduction of a redox couple at each electrode of the pair, thereby producing a region of increased or decreased conductivity that can be used to determine fluid flow rate.

Figure 1B:
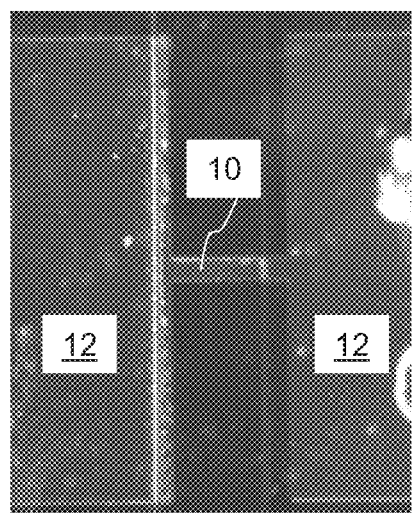

A representative example of the CP effect is shown in FIGS. 1A and 1B. FIG. 1A is an image of a nanochannel 10 having negative surface charges and being flanked by two microchannels 12 arranged co-linearly. The microchannels are filled with a solution containing a KCl electrolyte and Rhodamine 6G fluorescent dye. An electric field is applied across the nanochannel. The direction of the electric field is shown by arrow 14. A microscopic image of nanochannel 10 and microchannels 12 is shown in FIG. 1B. As shown in FIG. 1A, ionic concentration polarization is generated at both sides of nanochannel 10 wherein a depletion of ions is formed at a region marked by arrow 18 and an enrichment of ions is marked by arrow 16.

Figure 2:
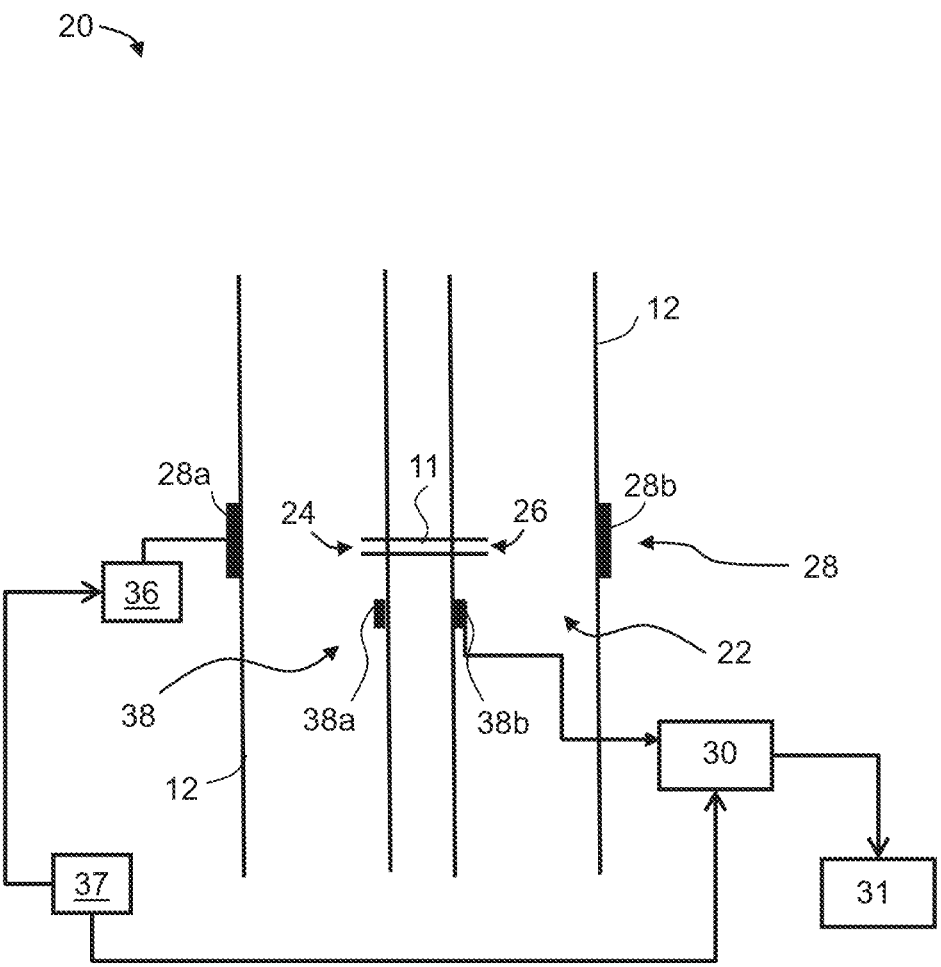
FIG. 2 is a schematic illustration of a microfluidic system, according to some embodiments of the present invention.

FIG. 2 is a schematic illustration of a microfluidic system 20, according to some embodiments of the present invention.

The term "microfluidic system" as used herein refers to a system having one or more fluid microchannels.

The term "microchannel" as used herein refers to a fluid channel having cross-sectional dimensions the smallest of which being less than 1 mm, more preferably less than 500 μm, more preferably less than 400 μm, more preferably less than 300 μm, more preferably less than 200 μm, e.g., about 100 μm or about 10 μm.

Thus, system 20 comprises one or more fluidic microchannels, such as, but not limited to, microchannels 12. Microchannel 12 can be a linear microchannel, in which case microchannels 12 extends along a generally (e.g., within deviation of 10% or less) straight line, or a nonlinear microchannel, in which case at least part of microchannels 12 extends along a curved line. Microchannel 12 can also be formed of a plurality of interconnected segments. These embodiments include a configuration in which all the segments are linear, or configuration in which all the segments are nonlinear, or a configuration in at least one of the segments is linear and at least one of the segments is nonlinear.

The length of microchannel 12 can vary, depending on the application for which system 20 is employed. As a representative non-limiting example, the overall length of microchannel 20 is from about 0.1 cm to about 20 cm.

Optionally and preferably, system 20 also comprises a sensor system generally shown at 22.

In various exemplary embodiments of the invention sensor system 22 detects at least one flow parameter characterizing the flow in microchannel 12 by exploiting the aforementioned CP effect. Sensor system 22 preferably comprises one or more ion permselective medium 11 having a first side 24 and a second side 26.

Ion permselective medium 11 can be any medium made, at least in part from a permselective material, and can have any structure, including, without limitation, a nanostructure, a nanoporous membrane and an electrode. The permselective medium 11 can, in some embodiments, be embodied as a permselective nanochannel, such as, but not limited to, nanochannel 10.

Ion permselective medium 11 is positioned in microchannel 12 to allow contact of sides 24 and 26 with the fluid in microchannel 12. This creates an interface between the fluid in microchannel 12 and medium 11, thereby allowing sensor system 22 to utilize the CP effect.

System 20 can further comprise an arrangement of electrodes 28 arranged to generate an electric field across permselective medium 11. This can be done by connecting electrodes 28 to a power source 36, which may effect an electrical potential difference across permselective medium 11. Via the CP effect, ionic concentration gradients are formed in microchannel 12, near sides 24 and 26 of permselective medium 11. FIG. 2 illustrates two electrodes 28a and 28b positioned outside microchannel 12. These electrodes do not necessarily be positioned in the vicinity of the permselective medium 11, but can also be applied further away (e.g., via electrodes immersed within the reservoirs of the inlets/outlets of the microchannels). However, this need not necessarily be the case, since, for some applications, it may be desired to position electrodes 28 inside microchannel 12.

In various exemplary embodiments of the invention system 20 comprises an ion concentration sensing system 38 configured to provide sensing signals indicative of ion concentration patterns (for example, shape, size) effected by the flow of fluid in the microchannel. These patterns typically constitute ionic concentration gradients. Optionally and preferably, system 20 or 22 comprises a controller 37 that controls power source 36 to ensure that the duration of the electric field generated by electrodes 28 is longer than, e.g., at least twice, the time required for the sensing signals provided by system 38 to exhibit saturation.

The time required for the sensing signals to exhibit saturation is referred to herein as "time-to-saturate" and denoted τ. The time-to-saturate τ can be defined as a difference $t_1-t_0$ between two instants of time $t_1$ and $t_0$, where $t_0$ is an onset time of the electric filed, and $t_1$ is an instant of time at which the time-derivative of the signal, in absolute value, reaches about 20% or 10% or 5% of its value at time t0.

As used herein, "saturation" of a signal means a situation in which the magnitude of the signal does not vary by more than X % over a period of time that is at least the time-to-saturate τ, where X is about 20 or about 10 or about 5.

Typically, but not necessarily, a situation in which the magnitude of the signal does not vary by more than 20% or more than 10% or more than 5% or over a period of 1 second or 2 seconds.

Ion concentration sensing system 38 can be of any type that is sensitive to ionic concentration and that can generate signals indicative of ion concentration patterns. Representative examples of such systems include, without limitation a spectroscopic system (e.g., atomic absorption spectroscopy, UV-visible spectroscopy etc.), an optical sensing system, an electric sensing system and a magnetic sensing system.

In some embodiments of the present invention ion concentration sensing system 38 has a sensing element 38a, which can be embodied, for example, as a pair of electrodes, which provides sensing signals indicative of a local ion concentration pattern. In some embodiments of the present invention sensing element 38a is proximal to permselective medium 11, but embodiments in which the sensing element is placed downstream or upstream medium 11 are also contemplated. In some embodiments of the present invention system 22 detects the flow parameter(s) by analyzing a sensing signal received from a single sensing element (e.g., sensing element 38a) of ion concentration sensing system 38.

The present embodiments also contemplate a configuration in which the electric field and the sensing signals are generated by the same set of electrodes, e.g., electrodes 28. In these embodiments, electrodes 28 are optionally and preferably within channel 12. In this configuration, system 22 can be devoted of passive electrodes such as electrodes 38. Thus, for example, the system can include a pair of electrodes positioned at opposite sides of the permselective medium, in contact with the fluid, wherein these electrodes are used both for generating an electric field and for sensing the ion concentration pattern across the permselective medium.

In some embodiments of the present invention, sensing system 38 is embodied as an arrangement of electrode pairs (e.g., a first pair of electrodes 38a, and a second pair of electrodes 38b) that are employed as one or more sensing pairs wherein electrical current, electrical impedance, electrical resistance, electrical conductance or the like, that is sensed by these pairs of electrodes is indicative of conductivity patterns near or at these electrodes. Since conductivity correlates with ion concentration, each of the pairs 38a, and 38b can serve as sensing elements in ion concentration sensing system 38.

While some embodiments are described with a particular emphasis to an ion concentration sensing system which is an electric sensing system, it is to be understood that more detailed reference to an electric sensing system is not to be interpreted as limiting the scope of the invention in any way.

In some embodiments of the present invention system 20 comprises a signal processor 30 configured for analyzing the signals provided by system 38 and for determining at least one flow parameter characterizing the flow in microchannel 12. For clarity of presentation, processor 30 is shown to be connected only to electrode pair 38b, but in a preferred embodiment the processor 30 communicates with all the sensing elements of system 38 and/or electrodes 28. For example, when electrodes 28 are used both for both for generating an electric field and for sensing the ion concentration pattern across the permselective medium, processor 30 communicates with electrodes 28, and system 20 can, but not necessarily, be devoid of electrodes 38.

Processor 30 can include an analog circuit for performing the analysis or it can include an analog-to-digital circuit form converting the signal to digital signals and a digital processing circuit for performing at least a portion of the analysis in a digital manner.

The parameter determined by processor 30 can be a numerical parameter such as, but not limited to, flow rate, a change in flow rate (e.g., the time-derivative of the flow rate and/or a gradient of flow rate), and a flow direction. The parameter is optionally and preferably extracted after a calibration process from raw local measurements of electrical parameter such as, but not limited to, an electrical current, an electrical impedance, an electrical resistance and/or an electrical conductance. The parameter determined by processor 30 can also be a local numerical parameter, such as, but not limited to, velocity vector field, change in the velocity field (e.g., the time-derivative of the velocity field and/or a gradient of velocity field) and the direction of the velocity field vector. The advantage of determining the direction of the flow is that it allows sensor system 22 to measure the flow parameter both when the fluid flow in one direction in microchannel 12, and when the fluid flow in the opposite direction in microchannel 12.

When the sensing elements of system 38 comprise electrodes (e.g., electrode pairs 38a and 38b) the sensing elements can be positioned in proximity to sides 24 and 26 of medium 11. Alternatively or additionally, one or more of the sensing elements is positioned farther from the respective end. When the sensing elements are in proximity to sides 24 and 26 of medium 11, processor 30 optionally and preferably measures changes in the conductivity pattern at sides 24 and 26.

Processor 30 can determine the flow pattern in more than one way. In some embodiments of the present invention processor 30 extracts from the sensing signals generated by one or more the sensing elements an electrical parameter (e.g., an electrical current, an electrical impedance, an electrical resistance and/or an electrical conductance), and correlates the extracted electrical parameter(s) to the flow parameter, optionally and preferably by direct correlation. The electrical parameter can be extracted separately from signals provided by different sensing elements, so that signals received from a single sensing element can be used by processor 30 to determine the flow parameter. When several sensing elements are used, processor 30 can determine the flow parameter based on signals received from any of these sensing elements. Preferably, processor 30 monitors the signals received from one or more of the sensing elements and determines whether or not these signals exhibit saturation, wherein the electrical parameter(s) are extracted during the saturation phase of the signals.

Processor 30 can also receive from controller 37 a clock signal indicative of the onset time of the electric field across medium 11, and use this clock signal to determine the elapsed time from the onset of the electric field to the onset of saturation. In these embodiments, processor 30 can optionally and preferably correlate this elapsed time to the flow parameter.

Processor 30 can also determine the flow parameter by means of a time-of-flight (TOF) measurements. These embodiments are useful when there is one or more sensing elements that is located proximal to medium 11, and one or more additional sensing elements located farther from medium 11, downstream with respect to medium 11. Processor 30 can measure the time interval that passes when the concentration pattern moves from medium 11 to the sensing element (referred to herein as the TOF of the concentration pattern). The TOF can be defined as the elapsed time between receipts of signals from the sensing element proximal to medium 11 and the sensing element farther and downstream from medium 11.

System 22 can employ two or more of the above techniques for determining the flow parameter, and output the result of each of these techniques, e.g., to a display device 31. Alternatively or additionally, processor 30 can output only a selected result, based on a predetermined criterion, such as, but not limited to, reproducibility and definiteness (non-ambiguity).

Thus, sensor system 22 optionally and preferably mimics a MEMS based thermal flow-meter sensor since it allows measuring the flow (a) at the permselective medium; (b) in proximity to the permselective medium; and/or (c) farther from the permselective medium, downstream therefrom.

Configuring processor 30 for determining any of the above parameters can be by calibration. For example, known flow rates can be transmitted through microchannel 12 and the signals from system 38 and/or electrodes 28 can be recorded and their pattern can be stored in a recording medium. In operation, processor 30 can compare the received signals with the stored signals and determine the flow rate based on the comparison. Similarly, known changes in flow rates can be transmitted through microchannel 12 and the signals from electrodes 28 can be recorded and their pattern can be stored in a recording medium. In operation, processor 30 can compare the received signals with the stored signals and determine the change of flow rate based on the comparison. Similarly, known flow directions can be transmitted through microchannel 12 and the signals from system 38 can be recorded and their pattern can be stored in a recording medium. In operation, processor 30 can compare the received signals with the stored signals and determine the direction of flow based on the comparison.

In any of the above calibration procedures, rather than storing the recorded patterns themselves, a calibration curve or lookup table can be stored on a computer readable medium. Such calibration curve or lookup table can include correlations found during the calibration process between the measured parameter (e.g., electrical parameter, time to reach saturation, time-of-flight) and the flow parameter, such that in operation, processor 30 extracts the respective parameter from the signals and correlates it to the flow parameter using the calibration curve or lookup table. Representative examples of calibration curves suitable for the present embodiments are shown in the Examples section that follows (see, for example, FIGS. 7D, 9A, 9B, 10C, 10D, 11B and 11C).

Typically, the recording and comparison and/or correlation are done digitally, in which case processor 30 is a digital signal processor. However, recording and comparison of analog signals and the use of analog processor is also contemplated.

System 20 can be used to convey, handle or analyze many types of fluids in microchannel 12. Representative examples including, without limitation, water, a biological fluid (for example, body fluid, e.g., blood, plasma, urine, saliva, vaginal secretions, feces, interstitial fluid, wound excrement), a bacterial cell suspension, a protein medium, an antibody medium, a nucleic acid medium, ink, and fluid media commonly used in standard medical applications such as phosphate buffered saline or other medicinal liquids (e.g., insulin, growth hormone, hemostatic agent solution). The fluid may include one or more types of objects therein, such as, but not limited to, a mixture of cell types. The fluid can also be of any type, including any chemical analytes, reagents, compounds etc.

Typically, sensor system 22 of system 20 is useful for measuring relative low flow rates (e.g., flow rate of less than 500 microliter per minute, or less than 100 microliter per minute, or less than 50 microliter per minute, or less than 25 microliter per minute, or less than 10 microliter per minute, or less than 5 microliter per minute, or less than 1 microliter per minute, or less than 0.1 microliter per minute, or less than 0.01 microliter per minute).

Figure 3A:
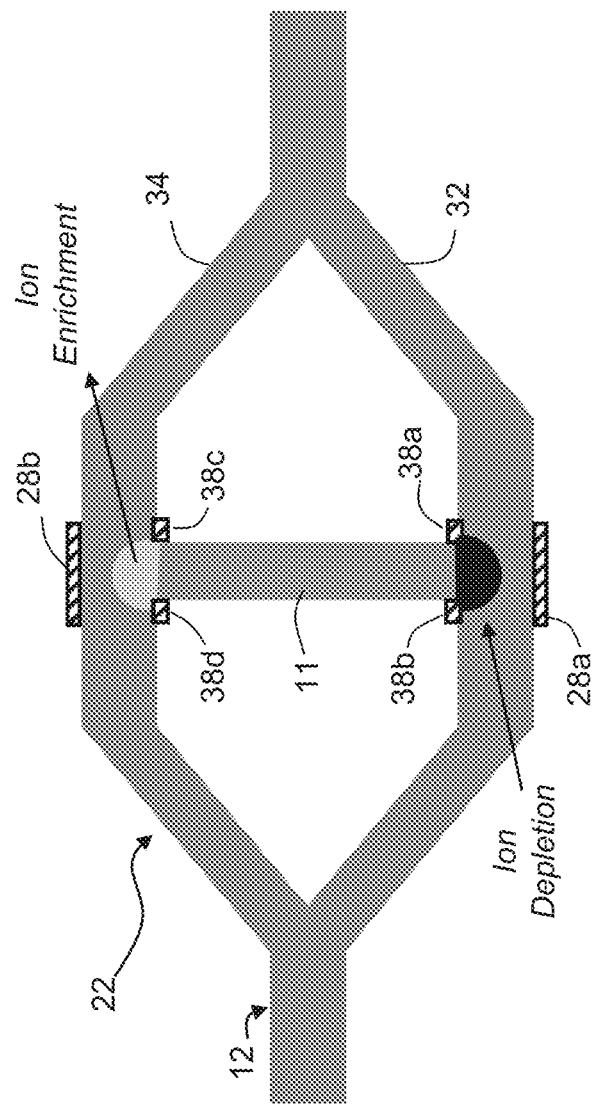
FIGS. 3A-C schematically illustrate a representative mode of operation of a microfluidic system according to some embodiments of the present invention.
Figure 3B:
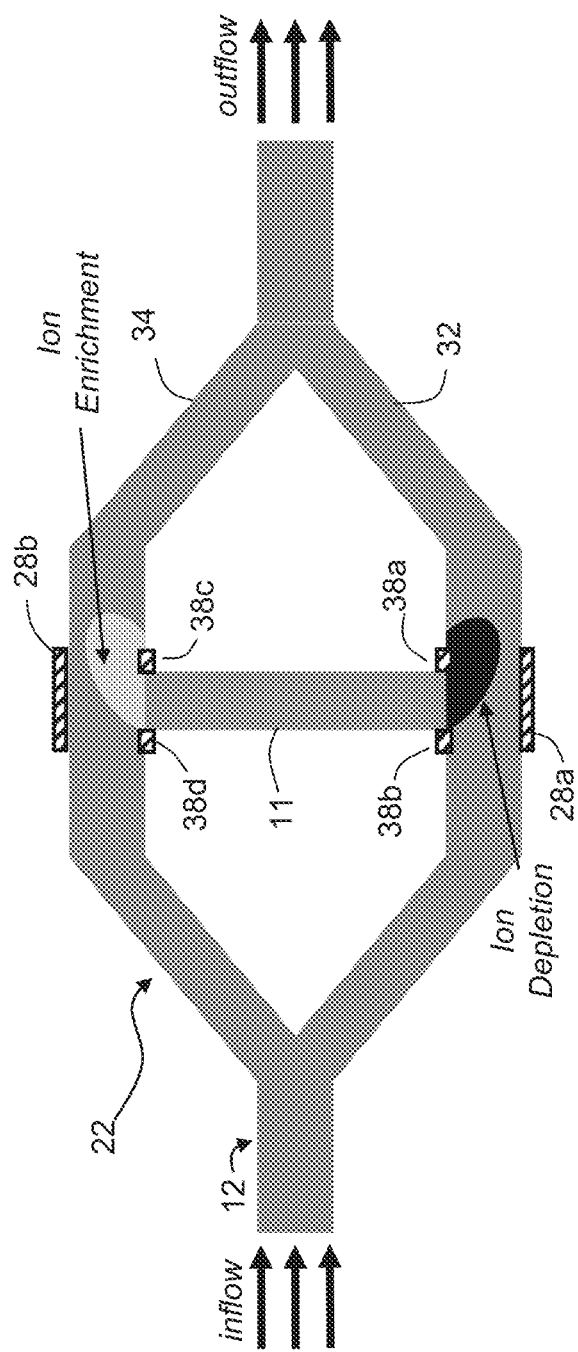
Figure 3C:
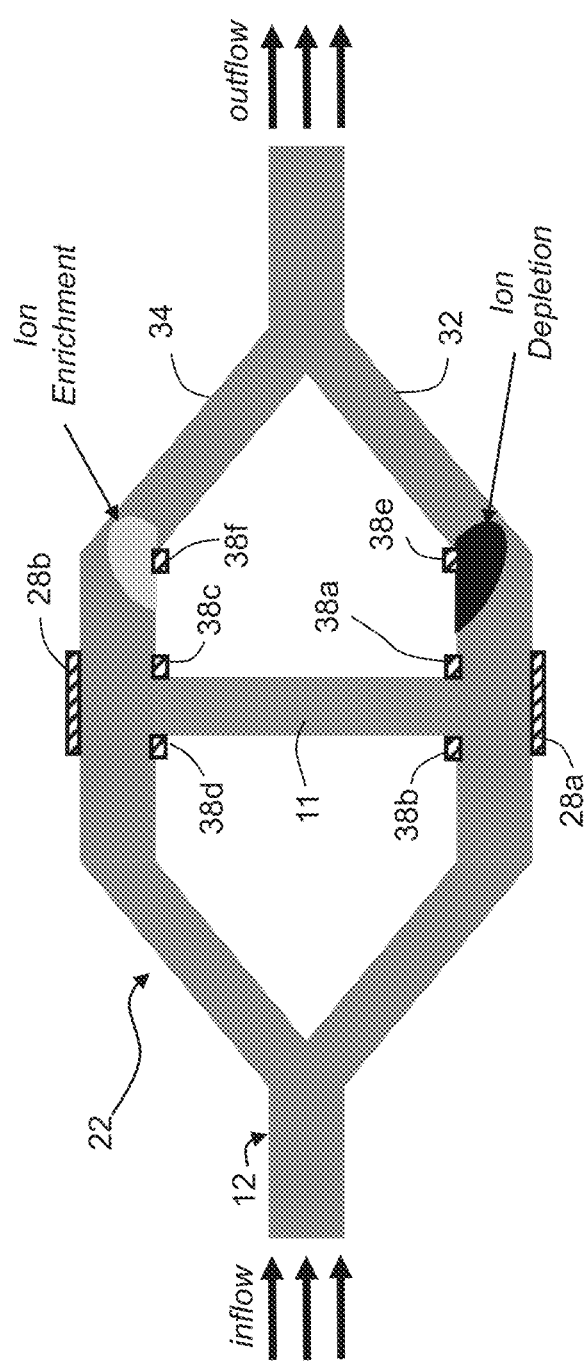

A representative mode of operation of the microfluidic system of the present embodiments is illustrated in FIGS. 3A-C. In this example, microchannel 12 is a branched fluidic microchannel, and medium 11 is embodied as a cation permselective membrane (e.g., Nafion) and is positioned to connect between two branches 32 and 34 of microchannel 12. FIG. 3A illustrates a static state in which no flow is forced into microchannel 12. Upon application of a voltage drop between electrodes 28a and 28b a depletion and enrichment ionic concentration layers are formed at the anodic and cathodic sides of the membrane 11, respectively.

FIG. 3B illustrates a state in which flow is forced into microchannel 12. The pattern of depletion and enrichment ionic concentration layers is changed due to the flow in branches 32 and 34, respectively. This change is sensed, for example, as the difference between the ion concentration (or proxy thereof) measured by sensing element 38a and the ion concentration (or proxy thereof) measured by sensing element 38b, both within the depletion ionic concentration deformed layer. This difference is correlated to the magnitude of the flow within microchannel 12. In the no-flow case (FIG. 3A) this difference vanishes. This change can additionally or alternatively be sensed as the difference between the ion concentration (or proxy thereof) measured by sensing element 38c and the ion concentration (or proxy thereof) measured by sensing element 38d, both within the enrichment ionic concentration deformed layer. This change can additionally or alternatively be sensed also using a single sensing element, which can be the sensing element proximal to the as further detailed hereinabove.

FIG. 3C illustrates an embodiment in which additional sensing elements 38e, 38f are positioned downstream the flow relative to membrane 11. These sensing elements can be used to measure the elapsed time for the depletion ionic concentration layer to propagate from element 38a to element 38e (interchangeably referred to as the time-of-flight of the depletion ionic concentration layer) and/or the enrichment ionic concentration layer to propagate from element 38c to element 38f (interchangeably referred to as the time-of-flight of the enrichment ionic concentration layer).

Figure 4A:
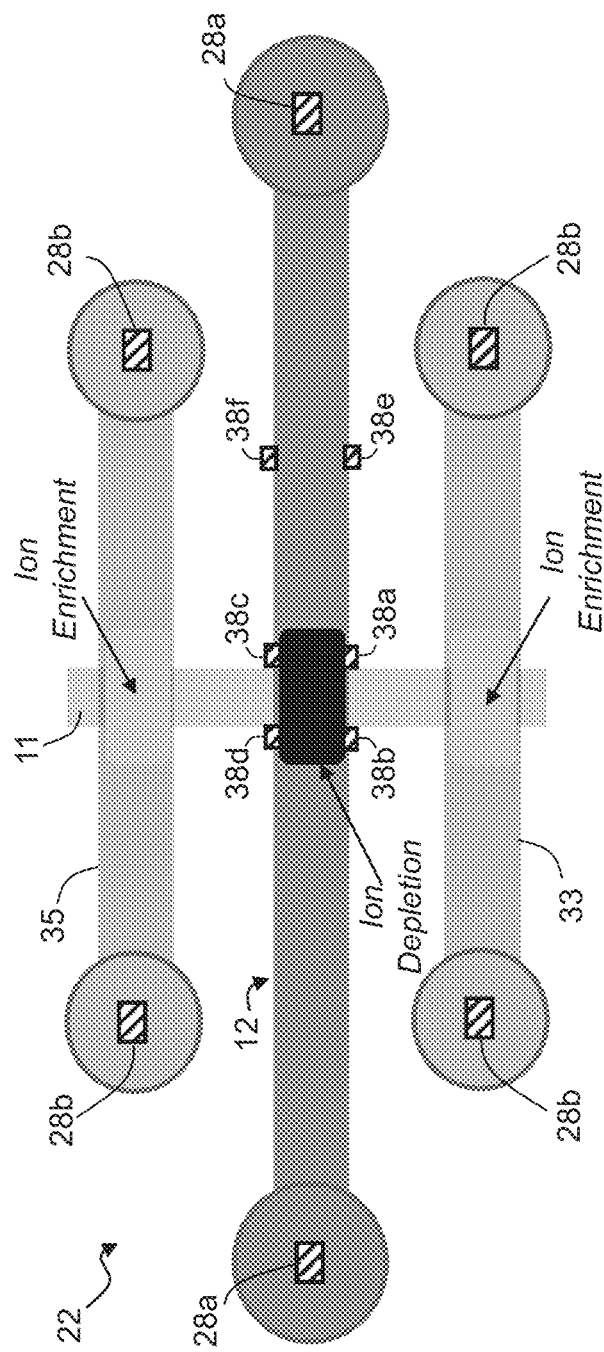
FIGS. 4A-C schematically illustrate an additional representative mode of operation of a microfluidic system according to some embodiments of the present invention.
Figure 4B:
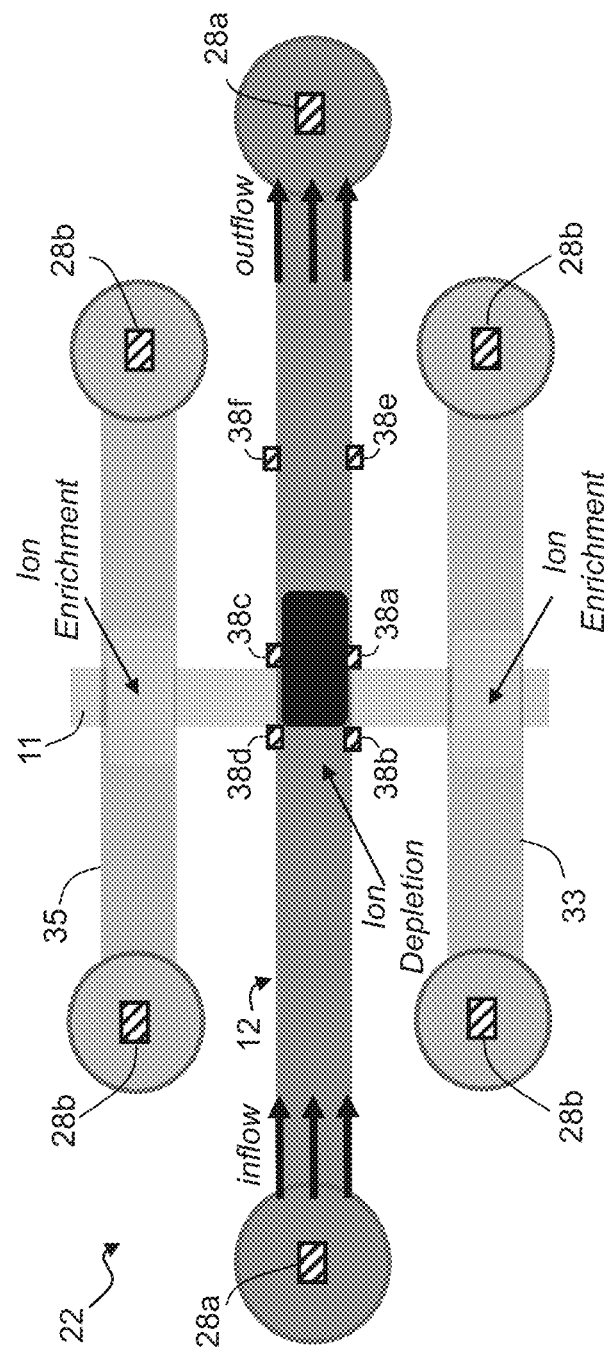
Figure 4C:
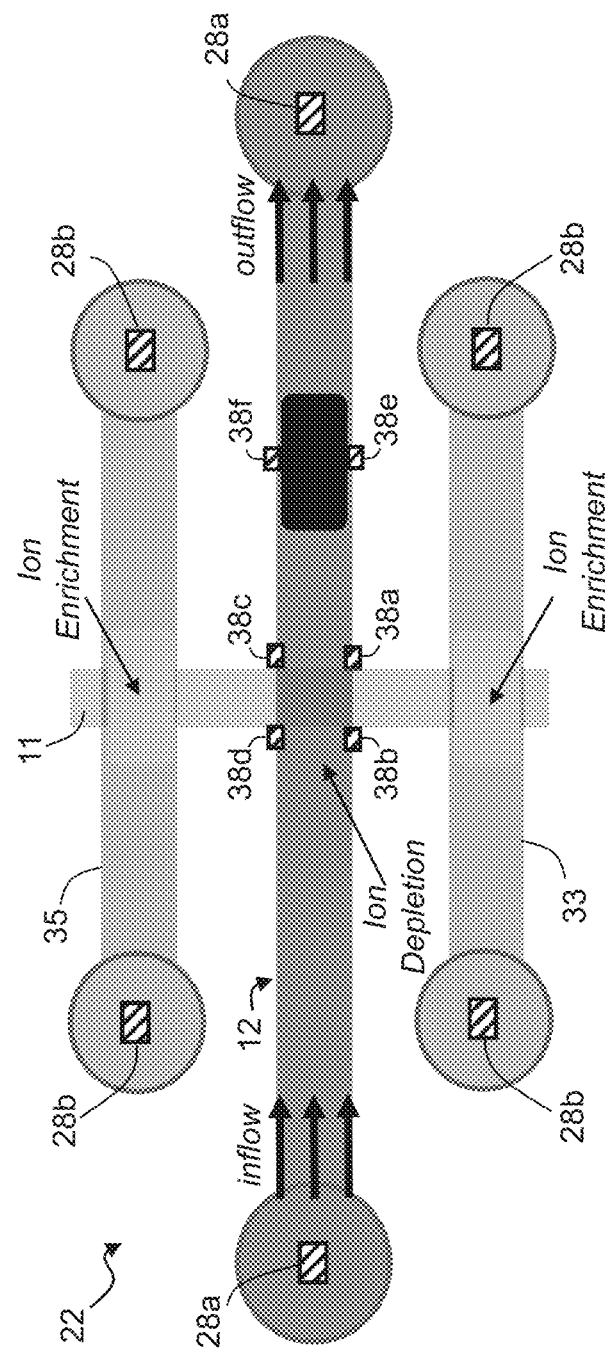

Another example of a possible mode of operation of the microfluidic system of the present embodiments is illustrated in FIGS. 4A-C. In this example, microchannel 12 is a non-branched fluidic microchannel, and medium 11 is embodied as a cation permselective membrane (e.g., Nafion) and is positioned to connect between two separate microchannels 33 and 35 at the opposite sides of the main microchannel 12. The two side microchannels 33 and 35 do not necessarily contain the same fluid as in microchannel 12. In some embodiments of the present invention they contain a stagnant electrolyte that allows the introduction of electrodes 28*b* for application of an electric field through the permselective medium.

In the specific example shown in FIGS. 4A-C electric field, optionally and preferably a symmetric electric field, with the line of symmetry along microchannel 12, is applied resulting in symmetric enrichment concentration layers within microchannels 33 and 35 and a symmetric depletion concentration layer within the main microchannel 12. In this example of a cation permselective membrane, electrodes 28*b* are cathodes preferably having the same negative potential, and electrodes 28*a* are anodes preferably having the same positive potential.

However, the setup is not limited to the application of such a symmetric electric field and the electrodes 28*b* within the top side microchannel 35 can have a different potential from the electrodes 28*b* at the bottom side microchannel 33. For example, when the former have a higher potential than that of the latter, and electrodes 28*a* are merely floating, then both enrichment and depletion ionic concentration layers develop within the microchannel 12.

FIG. 4A illustrates a static state in which no flow is forced into microchannel 12. Upon application of a voltage drop between electrodes 28*a* and 28*b* depletion and enrichment ionic concentration layers are formed at the anodic and cathodic sides of the membrane 11, respectively.

FIG. 4B illustrates a state in which flow is forced into microchannel 12. The pattern of depletion ionic concentration layer is changed due to the flow in the main microchannel 12 while the pattern of the enrichment ionic concentration layers is barely changed as the side microchannels do not sustain net flow. This change can be sensed by one of the sensing elements (e.g., sensing element 38*a*), for example, by extracting from the signal one or more electrical parameters or the time for saturation, and executing a correlation procedure to the flow parameter as further detailed hereinabove. This change can alternatively or additionally be sensed as the difference between the ion concentration (or proxy thereof) measured by sensing element 38*a* and the ion concentration (or proxy thereof) measured by sensing element 38*b*. This difference is correlated to the intensity of the flow within microchannel 12. In the no-flow case (FIG. 4A) this difference vanishes. This change can additionally or alternatively be sensed as the difference between the ion concentration (or proxy thereof) measured by sensing element 38*c* and the ion concentration (or proxy thereof) measured by sensing element 38*d*.

FIG. 4C illustrates an embodiment in which additional sensing elements 38*e*, 38*f* are positioned downstream the flow relative to membrane 11. These sensing elements can be used to measure the time-of-flight of the depletion ionic concentration layer from element 38*a* to element 38*e*, and/or from element 38*c* to element 38*f*.

In various exemplary embodiments of medium 11 is made, at least in part, of a permselective material. The use of permselective material is advantageous because it enhances the CP effect at sides 24 and 26 of medium 11.

The term "permselective material," as used herein, refers to an ion permeable material having the property that the ion transport number (also called the transference number, and is the fraction of the total current carried by a given ion) through the material is higher for ionic species having a certain charge sign than for ionic species having the opposite charge sign.

In some embodiments of the present invention permselective material has the property that the transport number through the material is higher for ion of one species than for ions of another species.

For example, in a permselective material such as a cation exchange membrane, cations pass through the material more easily (i.e., while experiencing less resistive force) than anions. In a permselective material such as an anion exchange membrane, anions pass through the material more easily (i.e., while experiencing less resistive force) than cations.

A permselective material is different from a porous structure that does not discriminate among differently charged ionic species as the species pass through the porous structure.

In some embodiments of the present invention the permselective material comprises a cation exchange material which is non-permeable to anions, and in some embodiments of the present invention the permselective material comprises an anion exchange material, which is non-permeable to cations.

A variety of permselective materials may be employed for medium 11. Representative examples including, without limitation, the sulfonic acid substituted perfluorocarbon polymers of the type described in U.S. Pat. No. 4,036,714; the primary amine substituted polymers described in U.S. Pat. No. 4,085,071; the polyamine substituted polymers of the type described in U.S. Pat. No. 4,030,988; and the carboxylic acid substituted polymers described in U.S. Pat. No. 4,065,366. All of the teachings of these patents are incorporated herein in their entirety by reference.

Examples of sulfonic acid substituted type materials include perfluorosulfonate cation exchange materials such as those membranes marketed commercially under the trademark NAFION®, manufactured and sold by the E.I. duPont de Nemours, Wilmington, Del. Typical membranes include the NAFION® 200 series, NAFION® 204, 214, 255, 295, the NAFION® 300 series, NAFION® 313, 315, 316, 324, 336, 337, 355, 376, 390, 391, and the NAFION® 400 series including NAFION® 427 membrane, mixtures thereof and the like. Also contemplated is the use of an amniotic membrane extract (AMX) as a permselective medium.

Medium 11 can be a nanochannel with at least one of its dimensions of the same order of magnitude as size of the electric double layer (EDL) so as to induce the overlap of EDLs from opposite channel walls. Techniques suitable for making such nanochannels, include, without limitation, photolithography, nanofabrication techniques such as focused-ion-beam (FIB), E-beam, nano-imprint lithography and the like.

Other ion permselective materials can be made of electrodes that support reaction with only one ionic species, such that effectively, it can be considered as permselective only for this ionic species that pass current through the reactions and leads to CP.

When permselective medium 11 is embodied as an electrode in direct contact with the fluid, it can comprise an adhesion layer (e.g. chromium, titanium, tantalum) and a conductive layer deposited thereon (e.g. gold, platinum).

A variety of materials and processes, according to certain embodiments of the invention, can be used to form microchannel 12. In some cases, the various materials selected lend themselves to fabrication techniques. For example, microchannel 12 can be formed from solid materials, in which the microchannels can be formed via molding, micromachining, film deposition processes such as spin coating and chemical vapor deposition, laser fabrication, photolithographic techniques, etching methods including wet chemical or plasma processes, and the like. Also contemplated are three-dimensional freeform fabrication techniques, such as three-dimensional jet printing, wherein patterns of printed material allow directional fluid transport.

At least a portion of microchannel 12 can be formed of a polymer, for example, an elastomeric polymer such as polydimethylsiloxane (PDMS), polytetrafluoroethylene (PTFE) or the like. Technologies for precise and efficient formation of microfluidic systems from such materials are known.

Microchannel 12 can be conveniently formed of a hardenable fluid, facilitating formation via molding (e.g., replica molding, injection molding, cast molding, etc.). The hardenable liquid can be essentially any liquid that can be induced to solidify, or that spontaneously solidifies, into a solid capable of containing and/or transporting fluids contemplated for use in and with a microfluidic system. In one embodiment, the hardenable liquid comprises a polymeric liquid or a liquid polymeric precursor. Suitable polymeric liquids can include, for example, thermoplastic polymers, thermoset polymers, or mixture of such polymers heated above their melting point. As another example, a suitable polymeric liquid may include a solution of one or more polymers in a suitable solvent, which solution forms a solid polymeric material upon removal of the solvent, for example, by evaporation. Such polymeric materials, which can be solidified from, for example, a melt state or by solvent evaporation, are well known to those of ordinary skill in the art. A variety of polymeric materials, many of which are elastomeric, are suitable. A non-limiting list of examples of such polymers includes polymers of the general classes of silicone polymers, epoxy polymers, and acrylate polymers. Epoxy polymers are characterized by the presence of a three-membered cyclic ether group commonly referred to as an epoxy group, 1,2-epoxide, or oxirane. For example, diglycidyl ethers of bisphenol A can be used, in addition to compounds based on aromatic amine, triazine, and cycloaliphatic backbones. Another example includes the well-known Novolac polymers. Non-limiting examples of silicone elastomers suitable for use according to the invention include those formed from precursors including the chlorosilanes such as methylchlorosilanes, ethylchlorosilanes, phenylchlorosilanes, etc.

In some embodiments of the invention silicone polymers are used. A representative example includes the silicone elastomer PDMS, which is commercially available, e.g., from Dow Chemical Co., Midland, Mich. Silicone polymers including PDMS have several beneficial properties simplifying formation of microchannel 12. For instance, such materials are inexpensive, readily available, and can be solidified from a liquid polymeric precursor via curing with heat. PDMSs are typically curable by exposure of the liquid polymeric precursor to temperatures of about 70° C. for exposure times of about an hour. Elastomeric polymer materials are also advantageous for their inertness to critical components of an analysis or synthesis to be carried out. Elastomeric polymer materials can also be coated with suitable materials as known in the art.

Other types of materials for microchannel 12 are also contemplated. Suitable materials are generally selected based upon their compatibility with the manufacturing process (injection molding, dry etching, embossing, bonding, soft lithography, stereolithography and three-dimensional jet printing, etc.) and the conditions present in the particular operation to be performed by the microfluidic system. Such conditions can include extremes of pH, pressure within the microchannels, temperature, ionic concentration, and the like.

Electrodes 28 can be made of any electrically conductive material, such as, but not limited to, a metal (e.g., gold, platinum, silver or silver chloride). Alternatively, electrodes 28 can be made of a semiconductor material, such as, but not limited to, a p-doped or n-doped semiconductor material (e.g., silicon electrode doped with boron or silicon electrode is doped with phosphorous). In embodiments in which the sensing elements of system 38 include electrodes, these electrodes can be made of any of the aforementioned electrically conductive or semiconductor materials.

Generally, the microfluidic system of the present embodiments can be used in many applications, preferably applications that require relatively low flow rate as indicated above. Representative example of suitable applications include without limitation, genetic applications, chemical applications, biochemical applications, pharmaceutical applications, biomedical applications, chromatography applications, integrated circuit cooling, ink-jet printing, medical applications, radiological applications and environmental applications.

Figure 5:
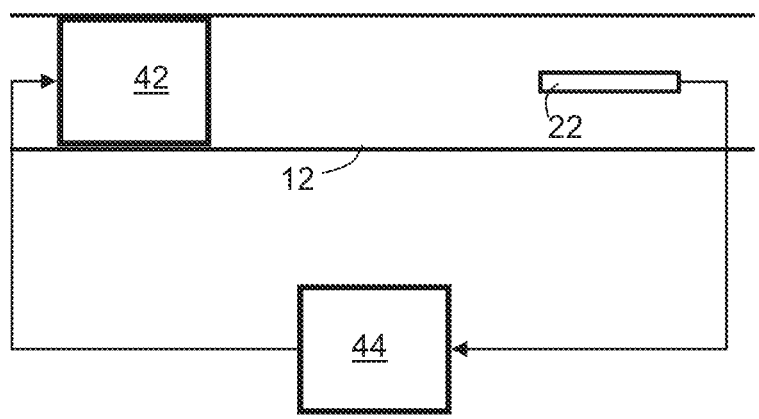
FIG. 5 is a schematic illustration of a microfluidic system, in embodiments of the invention in which the system includes a pump and a controller.

A representative application which can employ the system microfluidic system of the present embodiments is illustrated in FIG. 5. In this representative application, microfluidic system 20 comprises a pump 42 for generating flow in microchannel 12, and a controller 44 configured for controlling pump 42 responsively to the flow parameter determined by sensor system 22, thereby forming a closed loop control between pump 42 and sensor system 22. A representative utilization of this application is the medical field, for example, for the administration of a compound to a subject. For example, the system can be used as an insulin pump for providing a controlled rate of insulin delivery to a diabetic subject who would normally need multiple daily injections to regulate the blood glucose level. Existing pumps may not be as accurate as required by a particular treatment protocol, and the closed loop control of the present embodiments improves the accuracy of the delivery rate.

The system of the present embodiments is useful also for other medical applications, particularly but not necessarily for diagnostic and patient management. For environmental applications the microfluidic system of the present embodiments is suitable for detecting hazardous materials or conditions such as air or water pollutants, chemical agents, biological organisms or radiological conditions. For genetic and biochemical applications the microfluidic system of the present embodiments is suitable for testing and/or analysis of DNA, and other macro or smaller molecules, or reactions between such molecules in an approach known as "lab-on-chip."

The microfluidic system of the present embodiments can be used to obtain a variety of measurements including, without limitation, molecular diffusion coefficients, fluid viscosity, pH, chemical binding coefficients and enzyme reaction kinetics. Other uses for the microfluidic system of the present embodiments include, without limitation, immunoassays, flow cytometry, sample injection of proteins for analysis via mass spectrometry, sample injection of air or water samples for analysis via flamespectrometry, polymerase chain reaction (PCR) amplification, cell manipulation, cell separation, cell patterning and chemical gradient formation. Many of these applications have utility for basic research and clinical diagnostics.

The microfluidic system of the present embodiments can be integrated in microchips, such as DNA chips, protein chips and total analysis systems. For example, the microfluidic system of the present embodiments can be integrated in a DNA chip which includes a substrate for which probes with known identity are used to determine complementary binding, thus allowing massive parallel gene expression and gene discovery studies. The use of the microfluidic system of the present embodiments with such microchip can facilitate the production of small and high-density spots on the substrate. Since only a small amount of solution is needed to make one chip, the cost of chip production is substantially reduced. In addition, the microfluidic system of the present embodiments can create spots in consistent quantities and with uniform shape and size, so as to allow highly accurate comparisons between spots.

The microfluidic system of the present embodiments can also be used as a chromatograph for performing liquid chromatography.

The microfluidic system of the present embodiments can also be used as a microfluidic printing device, in which inks are formed by moving precursors through microchannels.

The microfluidic system of the present embodiments can also be used as a microfluidic mixer, in which one or more fluids are moved through a mixer inserted in a microchannel.

The microfluidic system of the present embodiments can also be used as an optical device, in which a bubble or slug of fluid immiscible in a second fluid is moved through the second fluid to a spot of optical activity on the substrate.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Figures 6A, 6B:
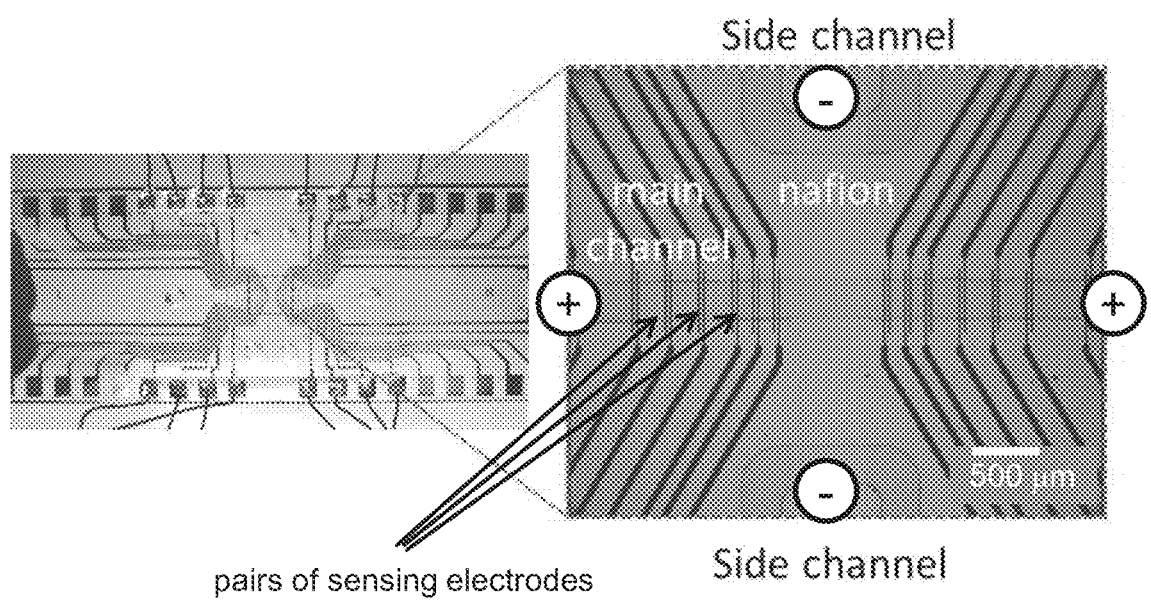
FIGS. 6A and 6B show images of a prototype sensor system used in experiments performed according to some embodiments of the present invention.

FIGS. 6A and 6B show images of a prototype sensor system used in experiments performed according to some embodiments of the present invention, where FIG. 6B is a magnified view of a dotted portion shown in FIG. 6A. The prototype system included two side channels, a main channel, and a NAFION® membrane connecting each of the side channels to the main channel. In the experiments, a positive electrical potential was applied at the ends of the main channel and a negative electrical potential was applied at the ends of the NAFION® membrane. A series of pairs of sensing electrodes was deployed across the main channel, at both sides of the membrane.

Two types of fluids were used in the experiments: a 1 mM KCl (conductivity of 100 µS/cm) and Insulin (conductivity of 2.1 mS/cm).

Figure 7A:
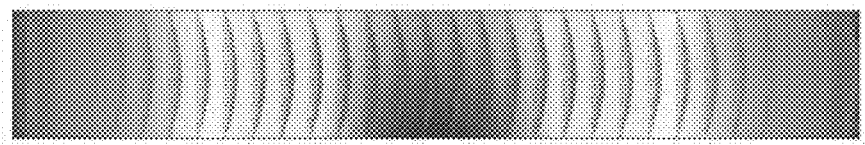
FIGS. 7A-D show computer simulation results that qualitatively describe experiments performed according to some embodiments of the present invention.
Figure 7B:
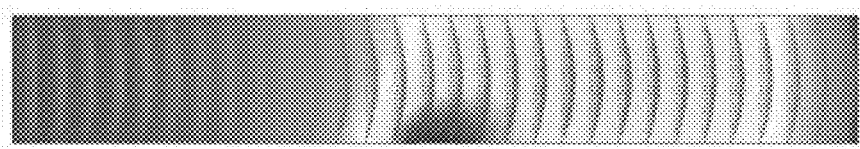
Figure 7C:
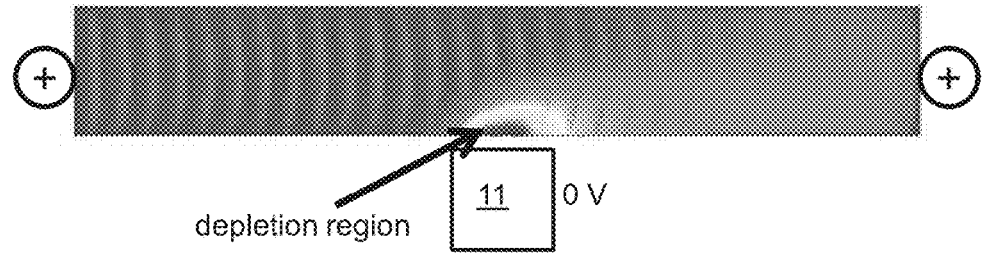
Figure 7D:
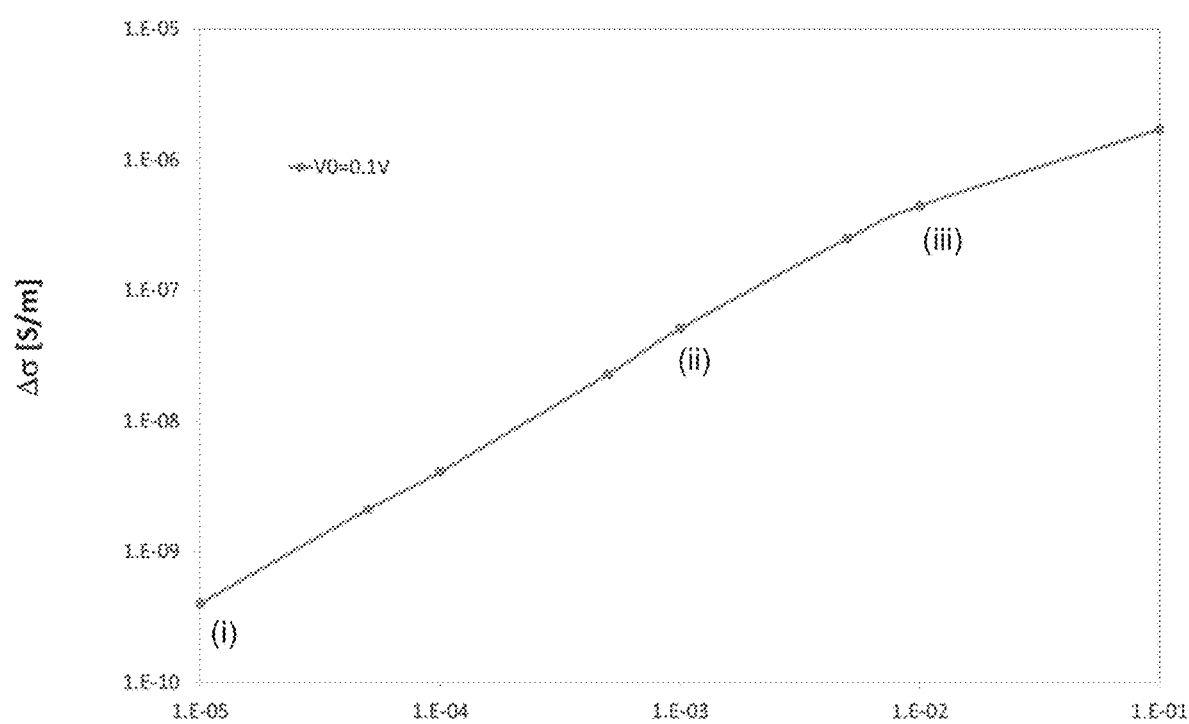

FIGS. 7A-D show computer simulation results of ion concentration during the flow in the main channel. FIGS. 7A-C show ion concentration patterns across the main channel at three different flow speeds (about $10^{-5}$ m/s, about $10^{-3}$ m/s, about $10^{-2}$ m/s, respectively), and FIG. 7D is a graph of the conductivity change $\Delta\sigma$ in S/m as a function of the flow speed $U_0$ in m/s. The points on the graph marked by (i), (ii) and (iii) correspond, respectively, to FIGS. 7A-C. The simulations demonstrate that the shape and size of the ion concentration pattern is indicative of the flow speed.

Figure 8A:
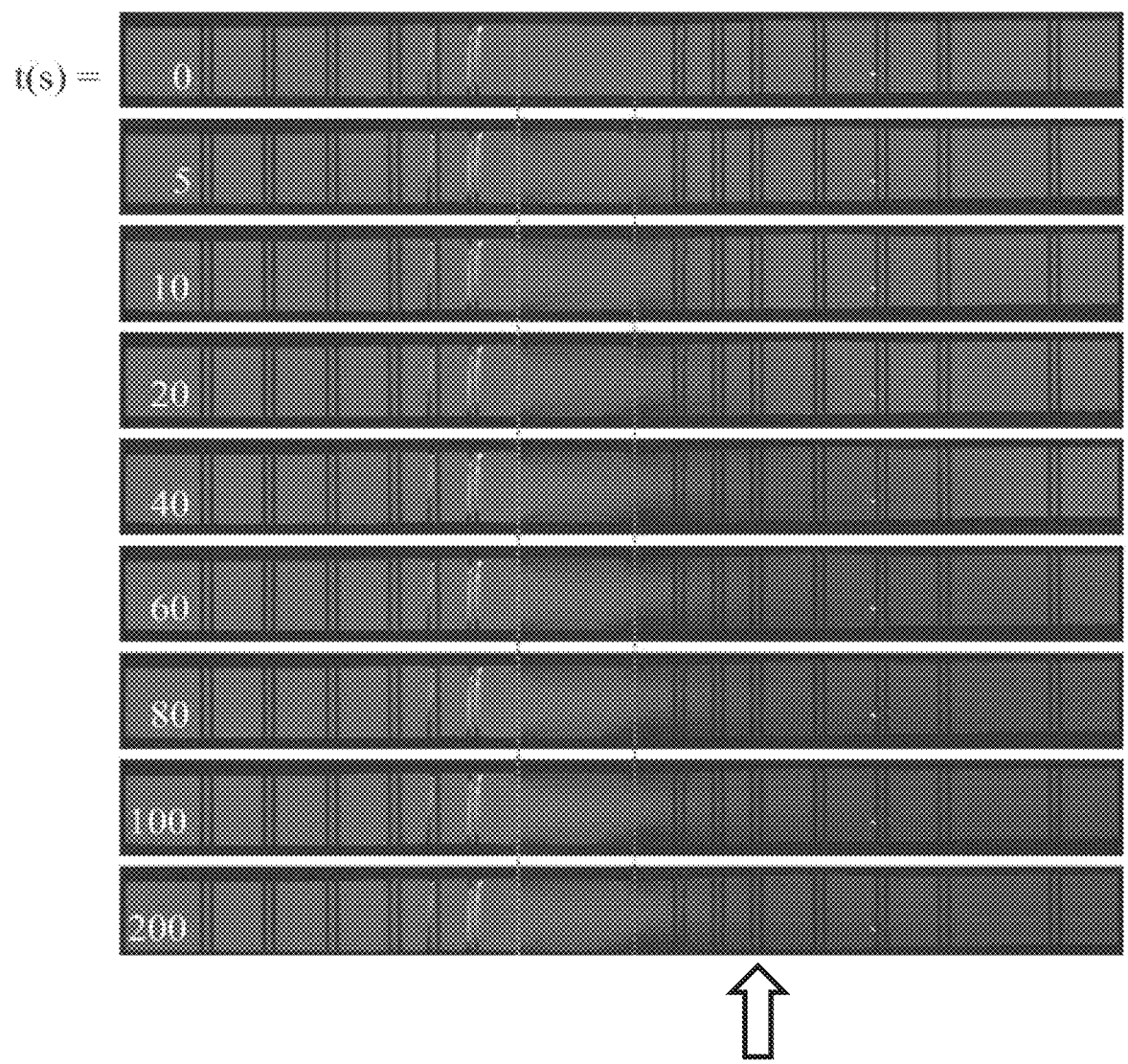
FIG. 8A is a series of images showing snapshots of a main channel of the prototype sensor system at different times during flow of 1 mM KCl at average speed of 66.4 µm/s, as measured in experiments performed according to some embodiments of the present invention.
Figure 8B:
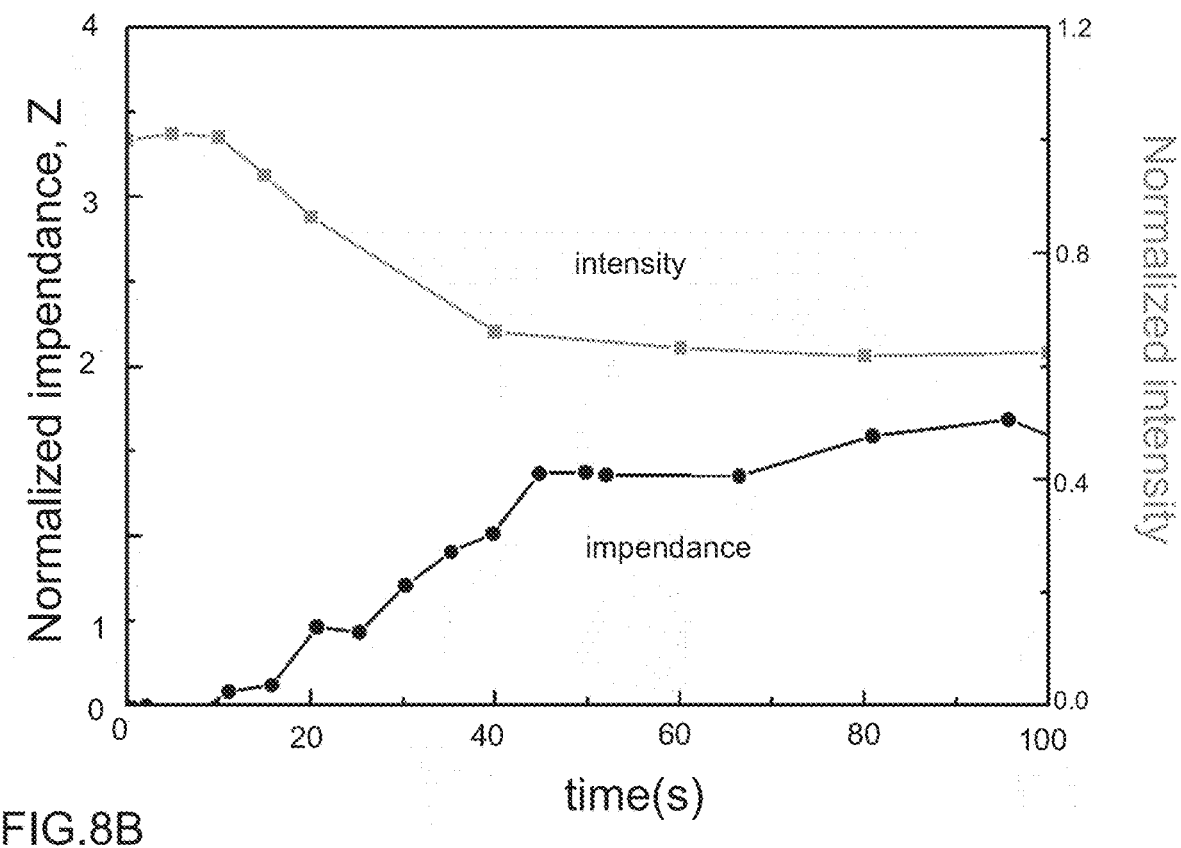
FIG. 8B shows graphs of normalized impedance and normalized intensity of a signal, as a function of the time, as measured in experiments performed according to some embodiments of the present invention.

FIG. 8A is a series of images showing snapshots of the main channel at different times (t=0, 5, 10, 20, 40, 60, 80, 100 and 200 seconds) during flow of 1 mM KCl at average speed of 66.4 µm/s. FIG. 8B shows graphs of the normalized impedance and normalized intensity of the signal, as a function of the time, as measured by a pair of sensing electrodes positioned about 500 µm downstream the membrane. The location of the sensing pair is marked by a block arrow in FIG. 8A. As shown, the impedance and intensity reached saturation after about 45 second.

Figure 9A:
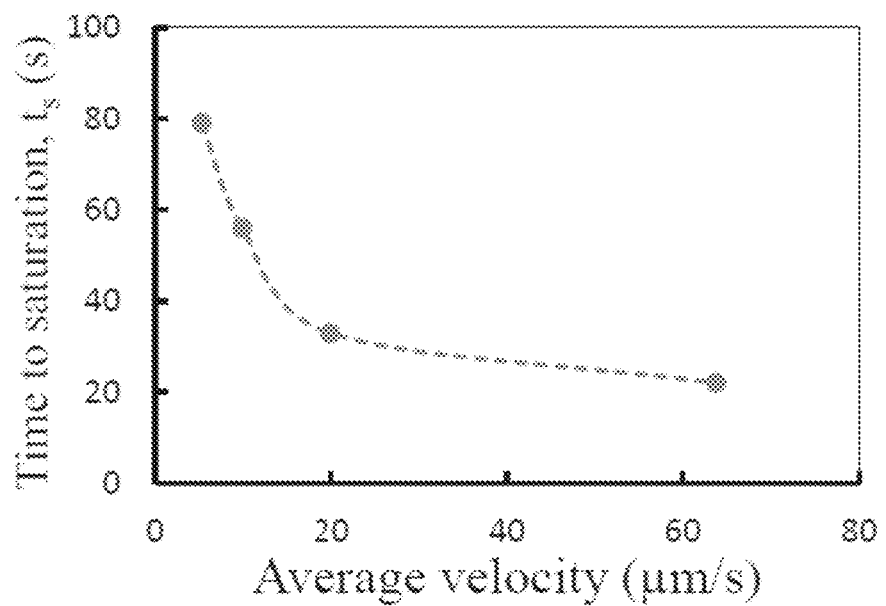
FIGS. 9A and 9B are graphs showing correlations between the flow speed of 1 mM KCl (in µm/s) and two measured parameters: the time to saturation of the impedance (FIG. 9A), and the change in electrical impedance during saturation (FIG. 9B)
Figure 9B:
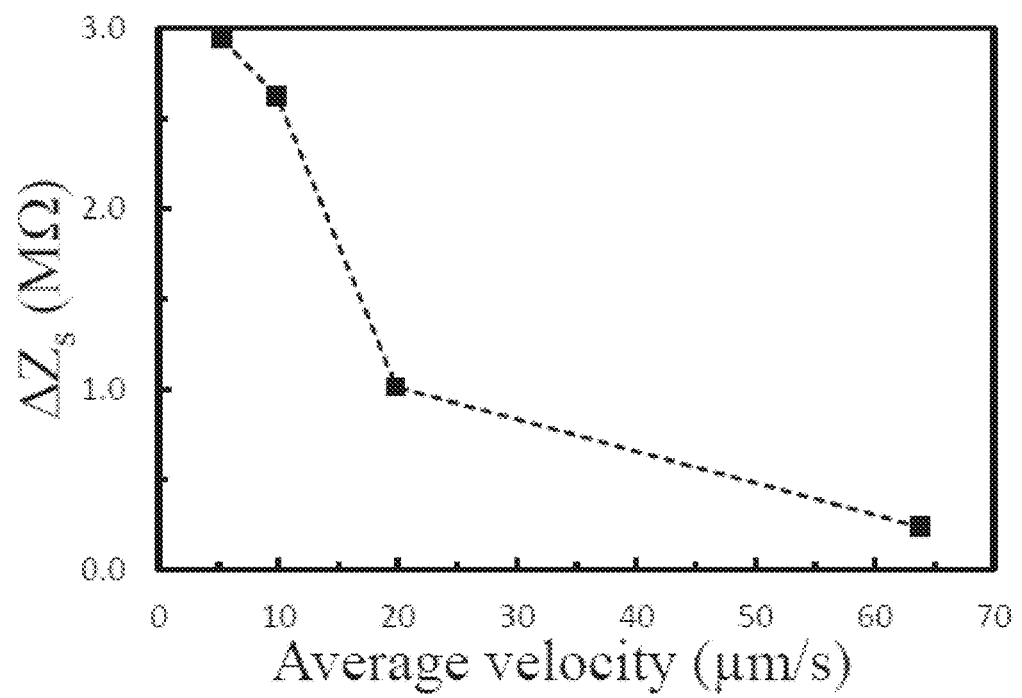

FIGS. 9A and 9B are graphs showing correlations between the flow speed of 1 mM KCl (in µm/s) and two measured parameters: the time to saturation of the impedance, in seconds (FIG. 9A), and the change in electrical impudence during saturation, in MΩ (FIG. 9B). As shown, the flow speed correlates well with both the parameters. The measurements were taken by a pair of sensing electrodes positioned about 130 µm downstream the membrane.

Figure 10A:
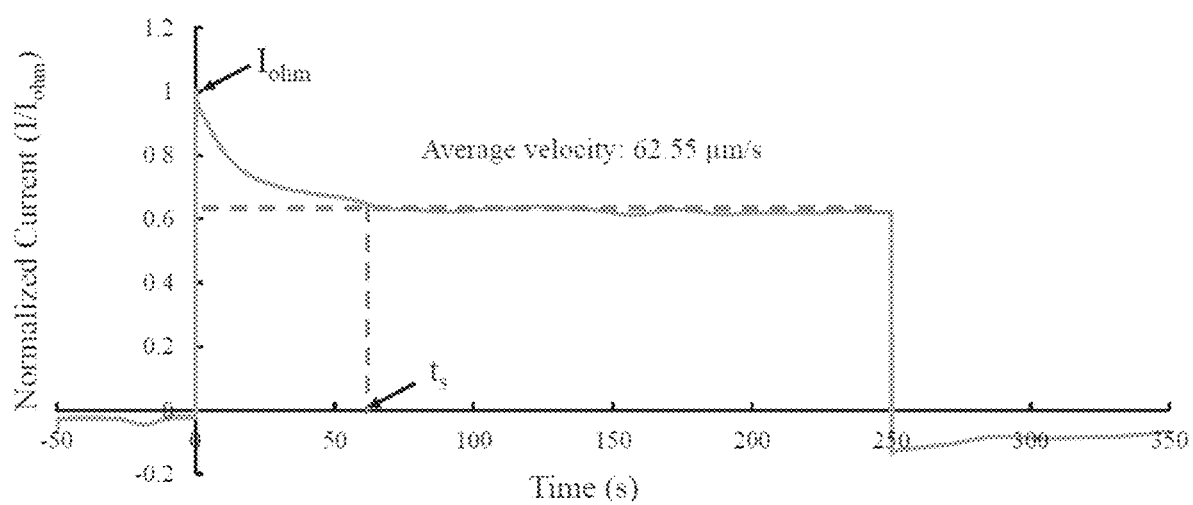
FIGS. 10A-D are graphs showing results of measurements taken across a membrane of the prototype sensor system, during flow of 1 mM KCl, as obtained in experiments performed according to some embodiments of the present invention.
Figure 10B:
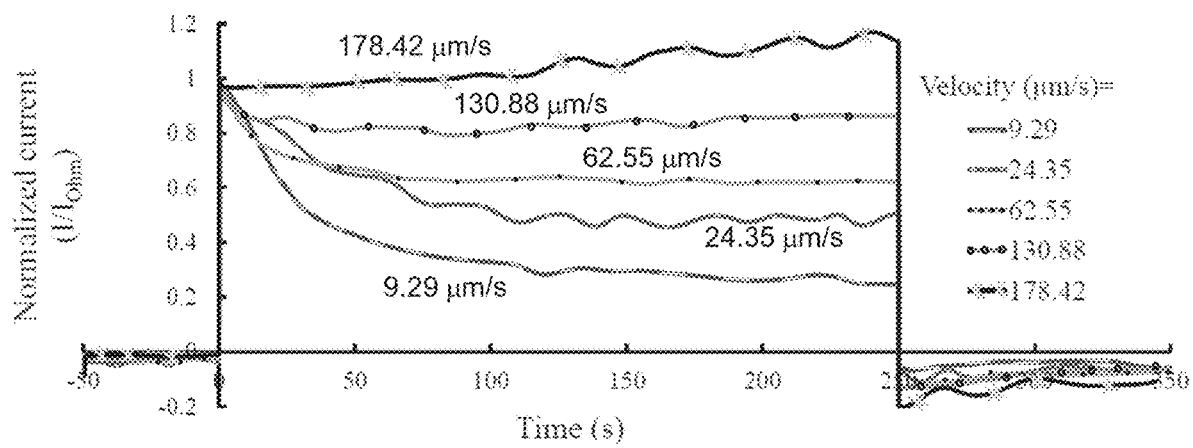
Figure 10C:
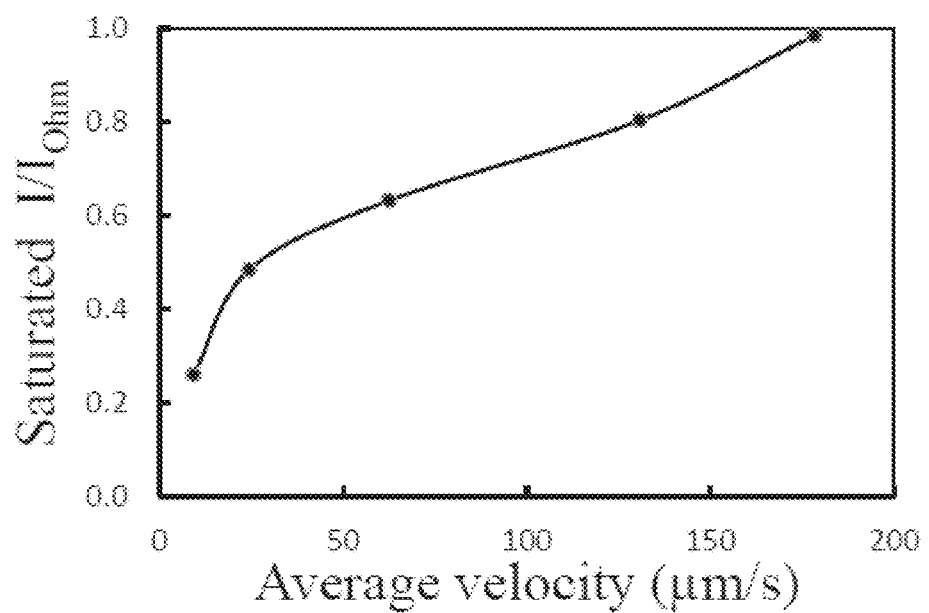
Figure 10D:
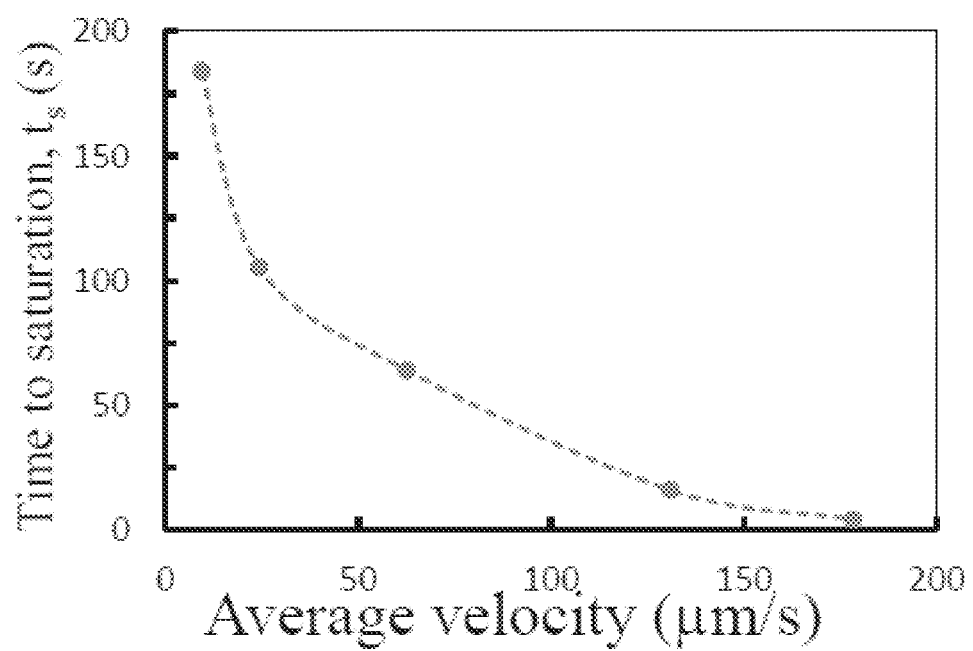

FIGS. 10A-D are graphs showing results of measurements were taken across the membrane using the same pair of electrodes used for generating the electrical field across the membrane, during flow of 1 mM KCl. FIG. 10A is a graph showing the normalized electrical current as a function of the time in seconds during flow at an average speed of about 62.55 µm/s. As shown, the current reaches saturation about 65 seconds following the onset of the electrical field. FIG. 10B shows the normalized electrical current as a function of the time in seconds for several different flow speeds, and FIGS. 10C and 10D show correlations between the average flow speed in µm/s and two measured parameters: the electrical current during saturation (FIG. 10C), and the time to saturation of the electrical current, in seconds (FIG. 10D). As shown, the flow speed correlates well with both the parameters.

Figure 11A:
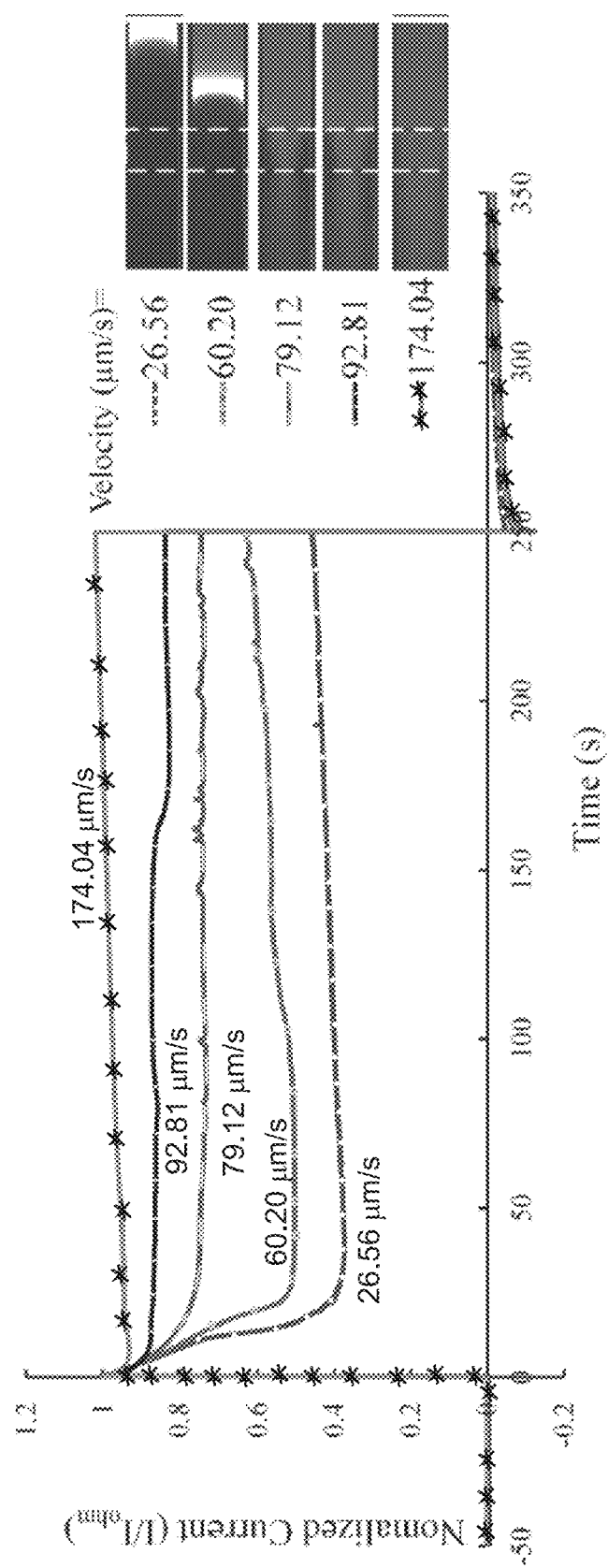
FIGS. 11A-C are graphs showing results of measurements taken across a membrane of the prototype sensor system, during flow of insulin, as obtained in experiments performed according to some embodiments of the present invention.
Figure 11B:
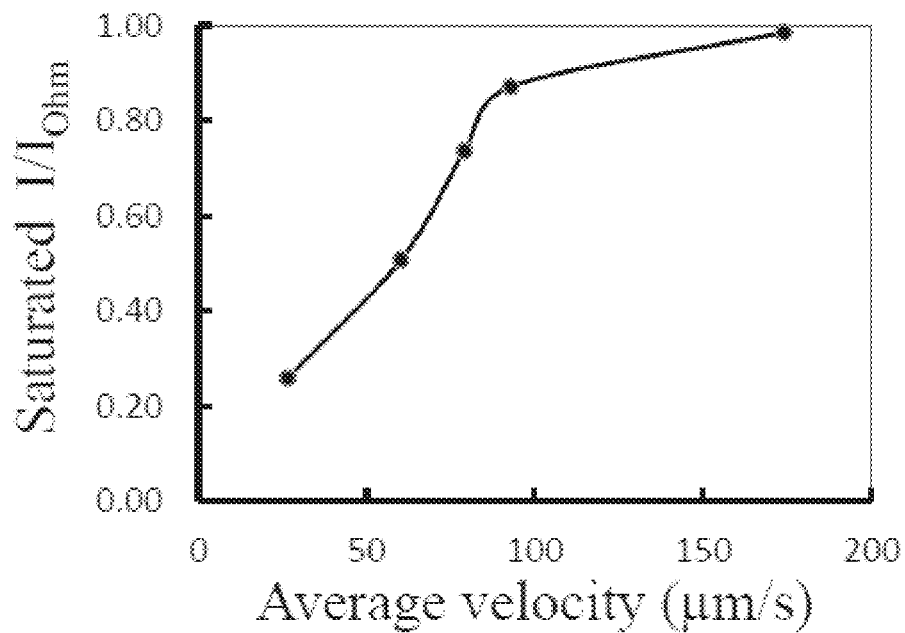
Figure 11C:
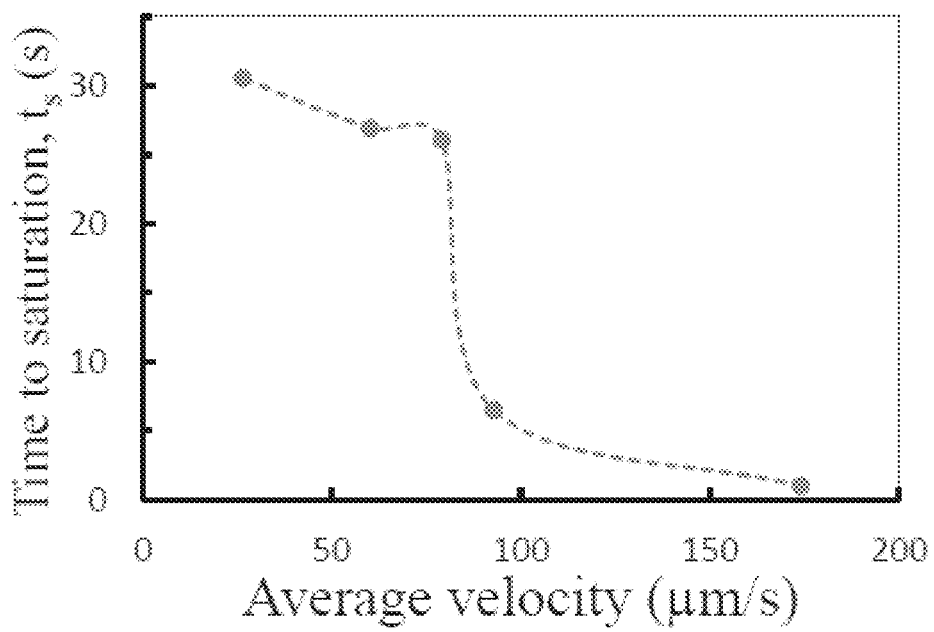

FIGS. 11A-C are graphs showing results of measurements were taken across the membrane using the same pair of electrodes used for generating the electrical field across the membrane, during flow of insulin. FIG. 11A shows the normalized electrical current as a function of the time in seconds for several different flow speeds, and FIGS. 11B and 11C show correlations between the average flow speed in µm/s and two measured parameters: the electrical current during saturation (FIG. 11B), and the time to saturation of the electrical current, in seconds (FIG. 11C). As shown, the flow speed correlates well with both the parameters. As shown, the flow speed correlates with both the parameters.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A microfluidic system, comprising:
   a microchannel; and
   a sensor system, positioned to measure flow in said microchannel, and comprising:
   a permselective medium positionable to contact the fluid in the microchannel, and being characterized by an ion transport number through said medium which is higher for ionic species having a first sign than for ionic species having a charge sign that is opposite to said first sign;
   two secondary microchannels positioned generally parallel to said microchannel, such that said permselective medium connects each of said secondary microchannels with said microchannel;
   an arrangement of electrodes arranged to generate an electric field across said permselective medium, and along said secondary microchannels;
   an ion concentration sensing system having at least one sensing element configured to provide sensing signals indicative of a local ion concentration pattern; and
   a signal processor configured to analyze a sensing signal received from a single sensing element of said ion concentration sensing system to determine at least one flow parameter characterizing said flow.

2. The microfluidic system of claim 1, further comprising a power source for driving to said arrangement of electrodes to generate said electric field, and a controller for controlling said power source to ensure that a duration of said generated electric field is longer than a time required for said sensing signals to exhibit saturation.

3. The microfluidic system according to claim 1, wherein said ion concentration sensing system comprises at least one system selected from the group consisting of a spectroscopic system, an optical sensing system, an electric sensing system and a magnetic sensing system.

4. The microfluidic system according to claim 1, wherein said permselective medium comprises at least one medium selected from the group consisting of: and a nanostructure, and a nanoporous membrane.

5. The microfluidic system according to claim 1, wherein said permselective medium comprises a cation exchange material.

6. The microfluidic system according to claim 5, wherein said cation exchange material is non-permeable to anions.

7. The microfluidic system according to claim 5, wherein said cation exchange material comprises at least one substance selected from the group consisting of a perfluorosulfonate cation exchange material, and amniotic membrane extract (AMX).

8. The microfluidic system according to claim 1, wherein said permselective medium comprises an anion exchange material.

9. The microfluidic system according to claim 8, wherein said anion exchange material is non-permeable to cations.

10. The microfluidic system according to claim 1, wherein said permselective medium is polymeric.

11. The microfluidic system according claim 1, wherein said at least one flow parameter comprises flow rate.

12. The microfluidic system according to claim 1, wherein said at least one flow parameter comprises flow direction.

13. The microfluidic system according to claim 1, wherein said signal processor is configured to determine said at least one flow parameter by extracting from said sensing signals at least one electrical parameter, and correlating said at least one electrical parameter to said at least one flow parameter.

14. The microfluidic system according to claim 13, wherein said at least one electrical parameter is selected from the group consisting of electrical current, electrical impedance, electrical resistance and electrical conductance.

15. The microfluidic system according to claim 1, wherein said signal processor is configured to determine a time required for said sensing signals to exhibit saturation, and for correlating said time to said at least one flow parameter.

16. The microfluidic system according to claim 1, wherein the microfluidic system comprises a pump for generating said flow, and a controller configured for controlling said pump responsively to said determined flow parameter.

17. A microfluidic system, comprising:

a branched fluidic microchannel; and a permselective medium connecting between two branches of said branched microchannel, and being characterized by an ion transport number through said medium which is higher for ionic species having a first sign than for ionic species having a charge sign that is opposite to said first sign;

an arrangement of electrodes arranged to generate an electric field across said permselective medium;

an ion concentration sensing system configured to provide signals indicative of ion concentration patterns effected by the flow of fluid in said microchannel; and a signal processor for analyzing said signals to determine at least one flow parameter characterizing said flow.

18. A microfluidic system, comprising:

a branched fluidic microchannel; and a sensor system positioned to measure flow in said branched fluidic microchannel;

wherein said sensor system comprises:

a permselective medium connecting between two branches of said branched microchannel, and being characterized by an ion transport number through said medium which is higher for ionic species having a first sign than for ionic species having a charge sign that is opposite to said first sign;

an arrangement of electrodes arranged to generate an electric field across said permselective medium, and to generate sensing signals indicative of ion concentration patterns effected by the flow of fluid in said microchannel; and a signal processor for analyzing said signals to determine at least one flow parameter characterizing said flow, wherein at least one pair of electrodes that generates said electric field also generates said sensing signals.

* * * * *